United States Patent
Sehlstedt et al.

(10) Patent No.: US 12,230,280 B2
(45) Date of Patent: *Feb. 18, 2025

(54) SPECTRAL SHAPE ESTIMATION FROM MDCT COEFFICIENTS

(71) Applicant: Telefonaktiebolaget LM Ericsson (publ), Stockholm (SE)

(72) Inventors: Martin Sehlstedt, Luleå (SE); Jonas Svedberg, Luleå (SE)

(73) Assignee: TELEFONAKTIEBOLAGET LM ERICSSON (PUBL), Stockholm (SE)

( * ) Notice: Subject to any disclaimer, the term of this patent is extended or adjusted under 35 U.S.C. 154(b) by 0 days.

This patent is subject to a terminal disclaimer.

(21) Appl. No.: 18/524,622

(22) Filed: Nov. 30, 2023

(65) Prior Publication Data

US 2024/0135936 A1    Apr. 25, 2024

Related U.S. Application Data

(63) Continuation of application No. 17/432,260, filed as application No. PCT/EP2020/054523 on Feb. 20, 2020, now Pat. No. 11,862,180.

(Continued)

(51) Int. Cl.
*G10L 19/005* (2013.01)
*G06F 17/14* (2006.01)
(Continued)

(52) U.S. Cl.
CPC .......... *G10L 19/005* (2013.01); *G06F 17/142* (2013.01); *G10L 19/02* (2013.01);
(Continued)

(58) Field of Classification Search
CPC .............................. G10L 19/02; G10L 19/005
See application file for complete search history.

(56) References Cited

U.S. PATENT DOCUMENTS

| 7,203,717 B1 | 4/2007 | Absar |
| 2003/0177011 A1 | 9/2003 | Yasuda et al. |

(Continued)

FOREIGN PATENT DOCUMENTS

| CN | 101207468 A | 6/2008 |
| CN | 101329871 A | 12/2008 |

(Continued)

OTHER PUBLICATIONS

International Search Report of the International Searching Authority, PCT/EP2020/054522, mailed Jun. 8, 2020, 4 pages.

(Continued)

*Primary Examiner* — Shaun Roberts
(74) *Attorney, Agent, or Firm* — Sage Patent Group

(57) ABSTRACT

A method, decoder, and program code for controlling a concealment method for a lost audio frame is provided. A first audio frame and a second audio frame of the received audio signal are decoded to obtain modified discrete cosine transform (MDCT) coefficients. Values of a first spectral shape based upon the MDCT coefficients decoded from the first audio frame decoded and values of a second spectral shape based upon MDCT coefficients decoded from the second audio frame decoded are determined, the spectral shapes each comprising a number of sub-bands. The values of the spectral shapes and frame energies of the first audio frame and second audio frame are transformed into representations of FFT based spectral analyses. A transient condition is detected based on the representations of the FFTs. Responsive to detecting the transient condition, the concealment method is modified by selectively adjusting a spectrum magnitude of a substitution frame spectrum.

25 Claims, 9 Drawing Sheets

Related U.S. Application Data

(60) Provisional application No. 62/808,587, filed on Feb. 21, 2019, provisional application No. 62/808,600, filed on Feb. 21, 2019, provisional application No. 62/808,610, filed on Feb. 21, 2019.

(51) Int. Cl.

| | | |
|---|---|---|
| *G10L 19/02* | (2013.01) | |
| *G10L 25/18* | (2013.01) | |
| *G10L 25/45* | (2013.01) | |
| *H04L 65/75* | (2022.01) | |
| *H04L 65/80* | (2022.01) | |

(52) U.S. Cl.
CPC ...... *G10L 19/0204* (2013.01); *G10L 19/0212* (2013.01); *G10L 25/18* (2013.01); *G10L 25/45* (2013.01); *H04L 65/75* (2022.05); *H04L 65/80* (2013.01)

(56) References Cited

U.S. PATENT DOCUMENTS

| | | |
|---|---|---|
| 2004/0088160 A1 | 5/2004 | Manu |
| 2007/0100606 A1 | 5/2007 | Rogers |
| 2009/0063137 A1 | 3/2009 | Tsai |
| 2013/0144632 A1 | 6/2013 | Sung |
| 2015/0228287 A1 | 8/2015 | Bruhn |
| 2015/0371641 A1 | 12/2015 | Bruhn |
| 2017/0178648 A1 | 6/2017 | Schug |
| 2017/0278520 A1 | 9/2017 | Oh et al. |
| 2017/0372707 A1 | 12/2017 | Biswas |

FOREIGN PATENT DOCUMENTS

| | | |
|---|---|---|
| CN | 101588341 A | 11/2009 |
| CN | 104995675 A | 10/2015 |
| CN | 105122356 A | 12/2015 |
| CN | 105408956 A | 3/2016 |
| CN | 106575505 A | 4/2017 |
| CN | 109155133 A | 1/2019 |
| CO | 2021004481 A2 | 7/2021 |
| EP | 3125239 A1 | 2/2017 |
| EP | 3176781 A2 | 6/2017 |
| JP | 2007512546 A | 5/2007 |
| JP | 2008129541 A | 6/2008 |
| JP | 2014531056 A | 11/2014 |
| JP | 2016038435 A | 3/2016 |
| JP | 2016510432 A | 4/2016 |
| WO | 02/071389 A | 9/2002 |
| WO | 2002071389 A1 | 7/2004 |
| WO | 2008062959 A1 | 5/2008 |
| WO | 2015003027 A1 | 1/2015 |
| WO | 2020053601 A1 | 3/2020 |

OTHER PUBLICATIONS

International Search Report of the International Searching Authority, PCT/EP2020/054520, mailed Jul. 7, 2020, 5 pages.
ETSI TS 126 445 V13.4.1 (Apr. 2017), 3GPP TS 26.445 version 13.4.1 Release 13, Universal Mobile Telecommunications System (UMTS); LTE; Codec for Enhanced Voice Services (EVS); Detailed algorithmic description, 661 pages.
ETSI TS 103 634 V0.1.1 (Jun. 2019), Digital Enhanced Cordless Telecommunications (DECT); Low Complexity Communication Codec Plus (LC3plus); XP14345925A, 152 pages.
Jacobsen et al., "Fast, Accurate Frequency Estimators", IEEE Signal Processing Magazine, May 2007, pp. 123-125.
Allie et al., "A Root of Less Evil", IEEE Signal Processing Magazine, Mar. 2005, pp. 93-96.
3GPP TS 26.447 V15.0.0 (Jun. 2018), Release 15, pp. 58-62.
3GPP TS 26.445 V15.1.0 (Dec. 2018), Release 15, pp. 570-571.
3GPP TS 26.445 V15.1.0 (Dec. 2018), Release 15, pp. 267-271.
International Search Report of the International Searching Authority, PCT/EP2020/054523, mailed Jun. 15, 2020, 4 pages.
Ito, Akinori, et al. "Improvement of packet loss concealment for MP3 audio based on swtiching of concealment method and estimation of MDCT signs. 2010 Sixth International Conference on Intelligent Information Hiding and Mukltimedia Signal Processing" IEEE, 2010.
Lecomte, Jeremie, et al. "Packet-loss concealment technology advances in EVS." 2015 IEEE International Conference on Acoustics, Speech and Signal Processing (ICASSP). IEEE, 2015. (Year: 2015).
Bruhn, Stefan, et al. "A novel sinusoidal approach to audio signal frame loss concealment and its application in the new evs codec standard." 2015 IEEE International Conference on Acoustics, Speech and Signal Processing (ICASSP). IEEE, 2015. (Year: 2015).
Japanese Office Action for Japanese Patent Application No. 2021-547686, mailed Dec. 6, 2022, 3 pages.
Colombian Patenability Analysis, International Application No. PCT/EP2020/054523, mailed Jan. 11, 2024, 17 pages.
Chinese First Office Action, Chinese Patent Application No. 202080015881.8, mailed Dec. 27, 2023, 4 pages.
Chinese Search Report, Chinese Patent Application No. 202080015881.8, mailed Dec. 27, 2023, 3 pages.
Translation of Japanese Office Action, Japanese Patent Application No. 2023-133704, mailed Nov. 5, 2024, 3 pages.

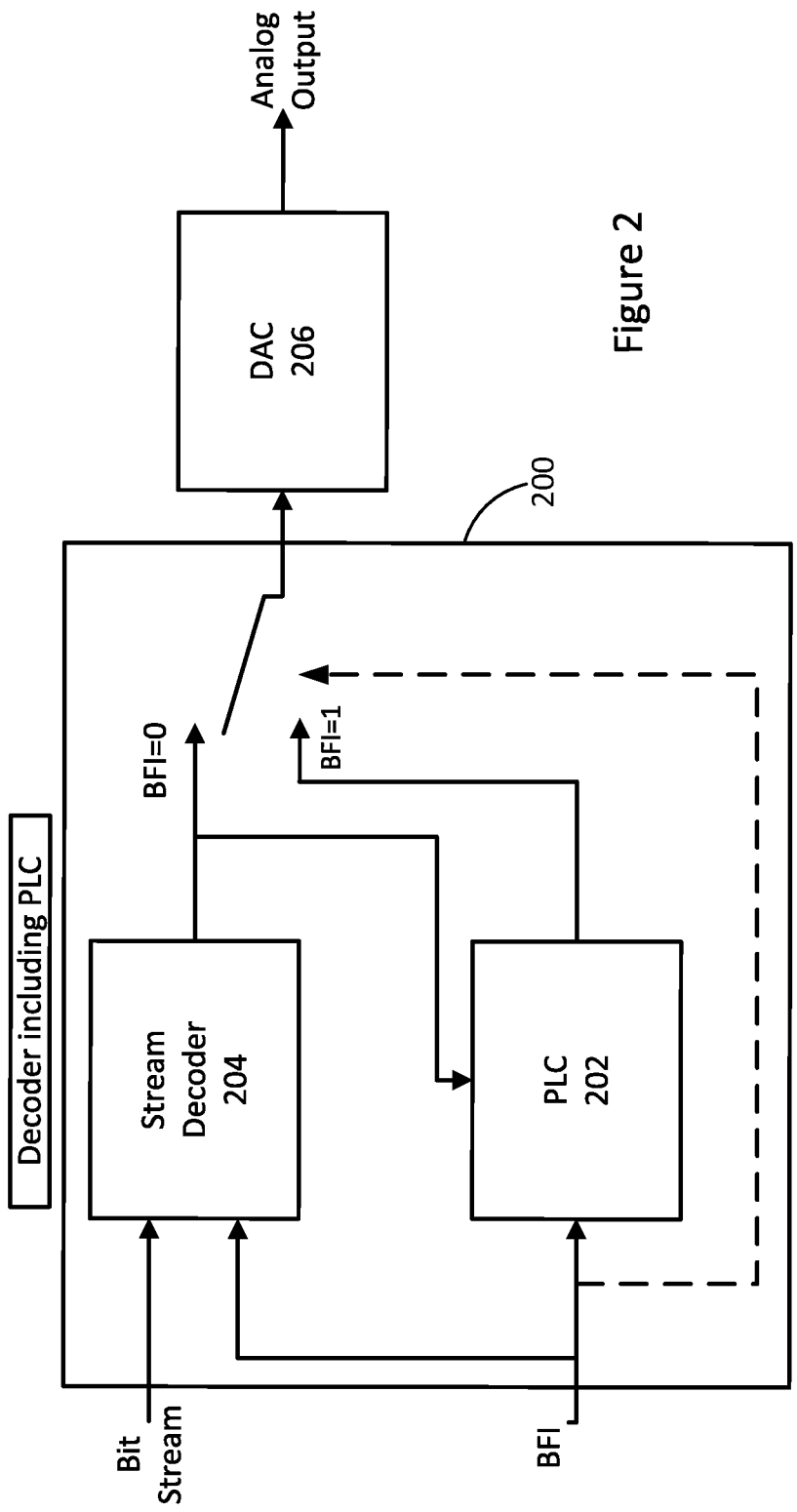

SPECTRAL SHAPE ESTIMATION FROM MDCT COEFFICIENTS

CROSS REFERENCE TO RELATED APPLICATIONS

This application is a continuation of U.S. application Ser. No. 17/432,260 filed on Aug. 19, 2021, which is a 35 U.S.C. § 371 national stage application of PCT International Application No. PCT/EP2020/054523 filed on Feb. 20, 2020, which claims the benefit of U.S. Provisional Application No. 62/808,587, filed on Feb. 21, 2019, U.S. Provisional Patent Application No. 62/808,600, filed on Feb. 21, 2019, and U.S. Provisional Application No. 62/808,610, filed on Feb. 21, 2019 the disclosures and contents of which are incorporated by reference herein in their entireties.

TECHNICAL FIELD

The invention relates generally to a method of concealing a lost audio frame associated with a received audio signal. The invention also relates to a decoder configured to conceal a lost audio frame associated with a received coded audio signal.

BACKGROUND

Transmission of speech/audio over modern communications channels/networks is mainly done in the digital domain using a speech/audio codec. This may involve taking the analog signal and digitalizing it using sampling and analog to digital converter (ADC) to obtain digital samples. These digital samples may be further grouped into frames that contain samples from a consecutive period of 10-40 ms depending on the application. These frames may then be processed using a compression algorithm, which reduces the number of bits that needs to be transmitted and which may still achieve as high quality as possible. The encoded bit stream is then transmitted as data packets over the digital network to the receiver. In the receiver, the process is reversed. The data packets may first be decoded to recreate the frame with digital samples which may then be inputted to a digital to analog converter (DAC) to recreate the approximation of the input analog signal at the receiver. FIG. 1 provides an example of a block diagram of an audio transfer using audio encoder and decoder over a network, such as a digital network, using the above-described approach.

When the data packets are transmitted over the network there can be data packets that may either be dropped by the network due to traffic load or dropped as a result of bit errors making the digital data invalid for decoding. When these events happen, the decoder needs to replace the output signal during periods where it is impossible to do the actual decoding. This replacement process is typically called frame/packet loss concealment. FIG. 2 illustrates a block diagram of a decoder 200 including packet loss concealment. When a Bad Frame Indicator (BFI) indicates lost or corrupted frame, PLC 202 may create a signal to replace the lost/corrupted frame. Otherwise, i.e. when BFI does not indicate lost or corrupted frame, the received signal is decoded by a stream decoder 204. A frame erasure may be signalled to the decoder by setting the bad frame indicator variable for the current frame active, i.e. BFI=1. The decoded or concealed frame is then input to DAC 206 to output an analog signal. Frame/packet loss concealment may also be referred to as error concealment unit (ECU).

There are numerous ways of doing packet loss concealment in a decoder. Some examples are replacing the lost frame with silence and repeating the last frame (or decoding of the last frame parameters. Other solutions try to replace the frame with the most likely continuation of the audio signal. For noise like signals, one solution generates noise with a similar spectral structure. For tonal signals, one may first estimate the characteristics of present tones (frequency, amplitude, and phase) and use these parameters to generate a continuation of the tones at the corresponding temporal locations of lost frames.

An example of another embodiment of an ECU is the Phase ECU, originally described in international patent application no. WO2014123470, where the decoder may continuously save a prototype of the decoded signal during normal decoding. This prototype may be used in case of a lost frame. The prototype is spectrally analyzed, and the noise and tonal ECU functions are combined in the spectral domain. The Phase ECU identifies tones and calculates a spectral temporal replacement of related spectral bins. The other bins may be handled as noise and are scrambled to avoid tonal artifacts in these spectral regions. The resulting recreated spectrum is inverse FFT (fast Fourier transform) transformed into time domain and the signal is processed to create a replacement of the lost frame.

Most signals rarely continue over long periods of time. To better handle error burst, the ECUs may use low resolution spectral estimates of the current input signal as a long term background estimate. During longer bursts, the ECU may change the target for the reconstruction over time. Initially the target is to replace the last signal. Over time the target may be changed over to a low resolution background estimate that would make the estimate more noise like, and eventually moved to a target of muting the output.

For packet loss concealment, one needs a low-resolution spectral representation of the current input. In embodiments described in international patent application no. WO2014123471 (see Appendix 1), the spectral representation may be created from two short FFT, each one being a quarter of the prototype frame and used for the transient detection. With short transforms, estimates may have high variance. To obtain a more stable long-term estimate, the average of the two FFTs may be used. In these embodiments, the FFT bins are grouped into sub-bands that approximately represents a critical band in the auditory system.

The long-term estimate may be used as a target spectrum in longer error bursts so that over time, the lost frames may be replaced with a signal that represents the current input background signal.

The drawback with this approach is that the short FFTs add substantial complexity in the first error frame. The first error frame already has high complexity as it used to do the complete PLC chain of spectral analysis, sinusoid location and temporal compensation of sinusoid components before one can do the reconstruction of the lost signal.

In such a case, the two short FFT (located at each side of the overall prototype frame) may also be used for a spectral transient detector (detecting onsets and offsets). Therefore, any replacement must be accurate enough to also be used for that purpose More information on how the Phase ECU PLC works can be found in international patent application no. WO2014123471 (see Appendix 1) and 3GPP TS 26.447 V15.0.0 clause 5.4.3.5.

SUMMARY

Various embodiments of the inventive concepts that are disclosed herein may arise from the present realization that the short FFTs add substantial complexity in the first error frame. The first error frame already has high complexity as it is used to do the complete PLC chain of spectral analysis, sinusoid location and temporal compensation of sinusoid components before one can do the reconstruction of the lost signal.

According to some embodiments of inventive concepts, methods are provided to control a concealment method for a lost audio frame associated with a received audio signal. In such methods, a first audio frame of the received audio signal is decoded to obtain modified discrete cosine transform, MDCT coefficients. Values of a first spectral shape are determined based upon the MDCT coefficients decoded from the first audio frame decoded, the first spectral shape comprising a number of sub-bands. A second audio frame of the received audio signal is decoded to obtain MDCT coefficients for the second audio frame. Values of a second spectral shape are determined based upon MDCT coefficients decoded from the second audio frame decoded, the second spectral shape comprising the number of sub-bands. The values of the first spectral shape and a first frame energy of the first audio frame are transformed into a first representation of a first fast Fourier transform, FFT, based spectral analysis and the values of the second spectral shape and a second frame energy of the second audio frame are transformed into a second representation of a second FFT spectral analysis. A transient condition is detected based on the first representation of the first FFT and the second representation of a second FFT. Responsive to detecting the transient condition, the concealment method is modified by selectively adjusting a spectrum magnitude of a substitution frame spectrum.

According to some embodiments of inventive concepts, a decoder apparatus is provided to control a concealment method for a lost audio frame associated with a received audio signal. The decoder apparatus decodes a first audio frame of the received audio signal to obtain modified discrete cosine transform, MDCT, coefficients. The decoder apparatus determines values of a first spectral shape based upon MDCT coefficients decoded from the audio frame decoded, the first spectral shape comprising a number of sub-bands. The decoder apparatus decodes a second audio frame of the received audio signal. The decoder apparatus determines values of a second spectral shape based upon MDCT coefficients decoded from the second audio frame decoded, the second spectral shape comprising the number of sub-bands. The decoder apparatus transforms the values of the first spectral shape and a first frame energy of the first audio frame into a first representation of a first fast Fourier transform, FFT, based spectral analysis and transforms the values of the second spectral shape and a second frame energy of the second audio frame into a second representation of a second FFT spectral analysis. The decoder apparatus detects, based on the first representation of the first FFT and the second representation of a second FFT, a transient condition. The decoder apparatus responsive to detecting the transient condition, modifies the concealment method by selectively adjusting a spectrum magnitude of a substitution frame spectrum.

According to some embodiments of inventive concepts, a method by a computer processor for controlling a concealment method for a lost audio frame associated with a received audio signal is provided. The method includes decoding a first audio frame of the received audio signal based on a modified discrete cosine transform, MDCT. The method includes determining values of a first spectral shape based upon decoded MDCT coefficients from the decoded audio frame and storing the calculated values of the first spectral shape in a shape$_{old}$ buffer, the first spectral shape comprising a number of sub-bands. The method includes determining a first frame energy of the audio frame and storing the calculated first frame energy in an E_w$_{old}$ buffer. The method includes decoding a second audio frame of the received audio signal. The method includes moving the calculated values of the first spectral shape from the shape$_{old}$ buffer to a shape$_{old}$ buffer. The method includes moving the calculated first frame energy from the E_w$_{old}$ buffer to an E_w$_{oold}$ buffer. The method includes determining values of a second spectral shape based upon decoded MDCT coefficients from the decoded second audio frame and storing the calculated values of the second spectral shape in the shape$_{old}$ buffer the second spectral shape comprising the number of sub-bands. The method includes determining (915) a second frame energy of the second audio frame and storing the calculated second frame energy in the E_w$_{old}$ buffer. the method includes transforming the values of the first spectral shape and the first frame energy into a first representation of a first fast Fourier transform, FFT, based spectral analysis and transforming the values of the second spectral shape and the second frame energy into a second representation of a second FFT spectral analysis. The method includes detecting, based on the first representation of the first fast FFT and the second representation of a second FFT, a condition that could lead to suboptimal reconstruction quality of a substitution frame for the lost audio frame when the concealment method is used to create the substitution frame for the lost audio frame. The method includes responsive to detecting the condition, modifying (921) the concealment method by selectively adjusting a spectrum magnitude of a substitution frame spectrum.

The advantage of the techniques in various embodiments described below is that one can avoid using the two short FFTs. This is important as the avoidance directly reduces the complexity of the first lost frame and processing overhead of processing the lost frame. In the first lost frame the complexity is high as it involves both a rather long FFT of the prototype frame and an equally long inverse FFT of the reconstructed spectrum.

BRIEF DESCRIPTION OF THE DRAWINGS

The accompanying drawings, which are included to provide a further understanding of the disclosure and are incorporated in and constitute a part of this application, illustrate certain non-limiting embodiments of inventive concepts. In the drawings:

FIG. 1 illustrates a block diagram of using an audio encoder and an audio decoder over a network.

FIG. 2 is a block diagram of a decoder including packet loss concealment

DETAILED DESCRIPTION

Figure 3:
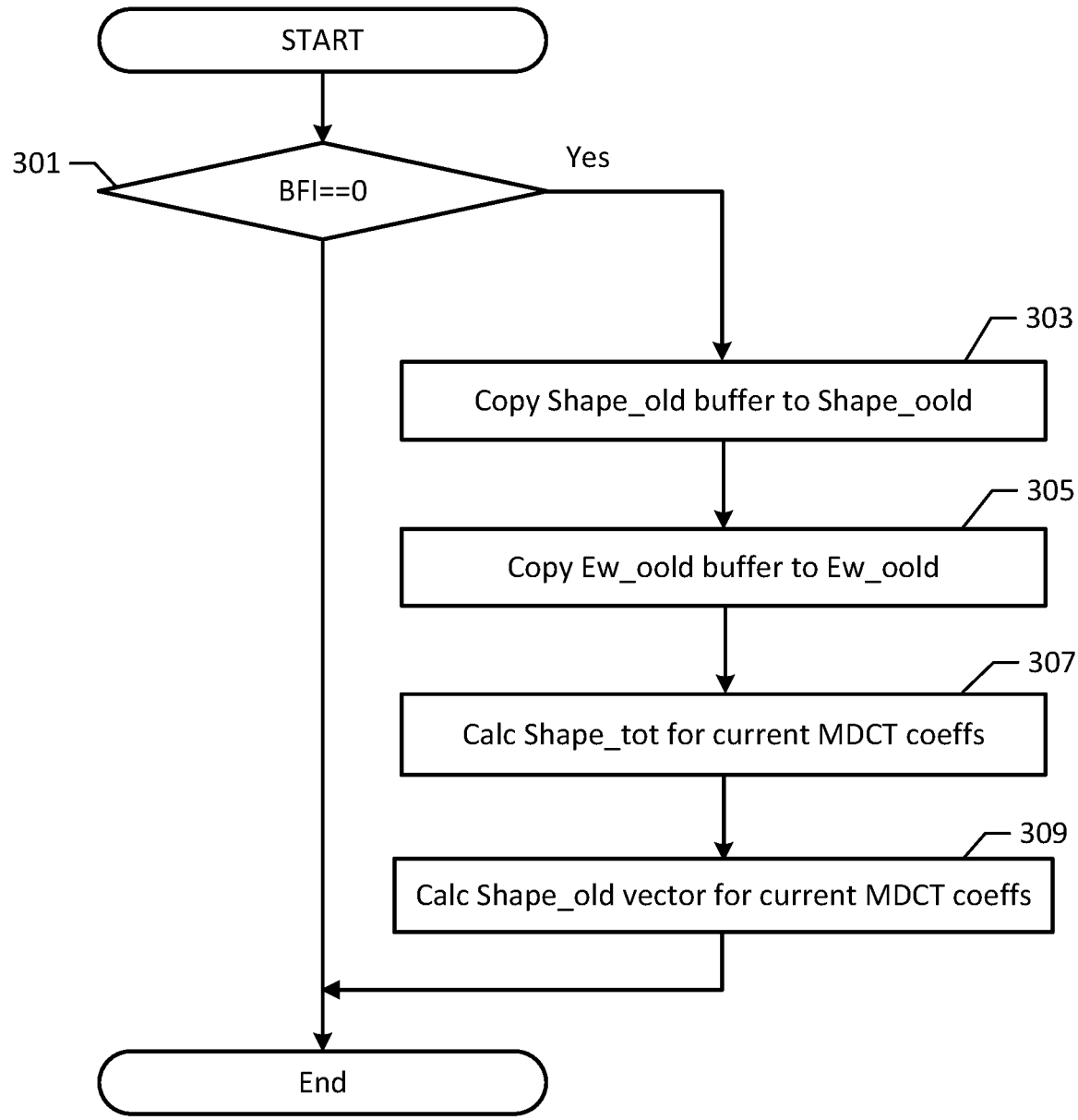
FIG. 3 is a flowchart of operations and methods that can be for updating spectral parameters during good frames in accordance with some embodiments of inventive concepts

Inventive concepts will now be described more fully hereinafter with reference to the accompanying drawings, in which examples of embodiments of inventive concepts are shown. Inventive concepts may, however, be embodied in many different forms and should not be construed as limited to the embodiments set forth herein. Rather, these embodiments are provided so that this disclosure will be thorough and complete, and will fully convey the scope of present inventive concepts to those skilled in the art. It should also be noted that these embodiments are not mutually exclusive. Components from one embodiment may be tacitly assumed to be present/used in another embodiment.

The following description presents various embodiments of the disclosed subject matter. These embodiments are presented as teaching examples and are not to be construed as limiting the scope of the disclosed subject matter. For example, certain details of the described embodiments may be modified, omitted, or expanded upon without departing from the scope of the described subject matter.

The inventive concepts described herein reduce the complexity of the PLC. These embodiments relate to reducing complexity in embodiments where the approach used for packet concealment is sinusoidal modeling in the frequency domain, with an additional low-resolution background noise model to better handle burst errors. In this case, over longer error bursts, the approach proceeds from the sinusoidal model towards the low-resolution noise model. The low-resolution noise model may be updated during the first error frame based on the saved prototype frame. The techniques described may also be used to determine a high quality (and low complexity) frequency band estimate of the energy decay over time for the signal in various frequency bands, which may be used to model the band energies of the concealed frame.

When the speech/audio compression is done in the frequency domain, there may already be spectral representation available in the frequency domain, most often in the modified discrete cosine transform (MDCT) domain. The coefficient of the available spectral representation in many situations can be used to form an alternative spectral shape to replace the complexity of short FFTs. For example, the spectral shapes of the first frame error can be used to create spectral estimates corresponding to those that would have been generated by the short FFTs.

In embodiments described herein, the available MDCT coefficients may be used to provide a spectral shape while the energy (or level) for the spectral estimate is based on the energy of the windowed prototype frame. However, the inventors came to the realization that using the MDCT coefficients alone for both shape and level has been found to provide insufficient quality estimates for the two short FFTs that are to be replaced.

The advantage of the techniques described below is that one can avoid using the two short FFTs. This is important as the avoidance directly reduces the complexity of the first lost frame. In the first lost frame the complexity is high as it involves both a rather long FFT of the prototype frame and an equally long inverse FFT of the reconstructed spectrum.

While the MDCT coefficients available in the decoder do not provide a stable energy estimate, the coefficients can be used for a spectral shape estimation. To get the level for the spectral estimate, the energy of a windowed prototype frame may be used as this may produce a better estimate of the actual FFT spectrum.

Avoiding the complexity of using the two shorter FFTs may result in a slight difference in both temporal characteristics and spectral characteristics. Such differences are of minor importance for the use in the form of a long-term estimate of the background signal, and the slight differences are also not a major issue for the transient detector energy decay estimation.

The inventive concept of the reuse of MDCT coefficients (or any other spectral domain information available in the normal coded domain) and the transformation into a spectral shape that can be used instead of the two short FFT transforms reduces complexity and processing overhead of processing the lost frame. This also involves how the MDCT coefficients are grouped into a format that approximates the FFT bins as close as possible.

Figure 12:
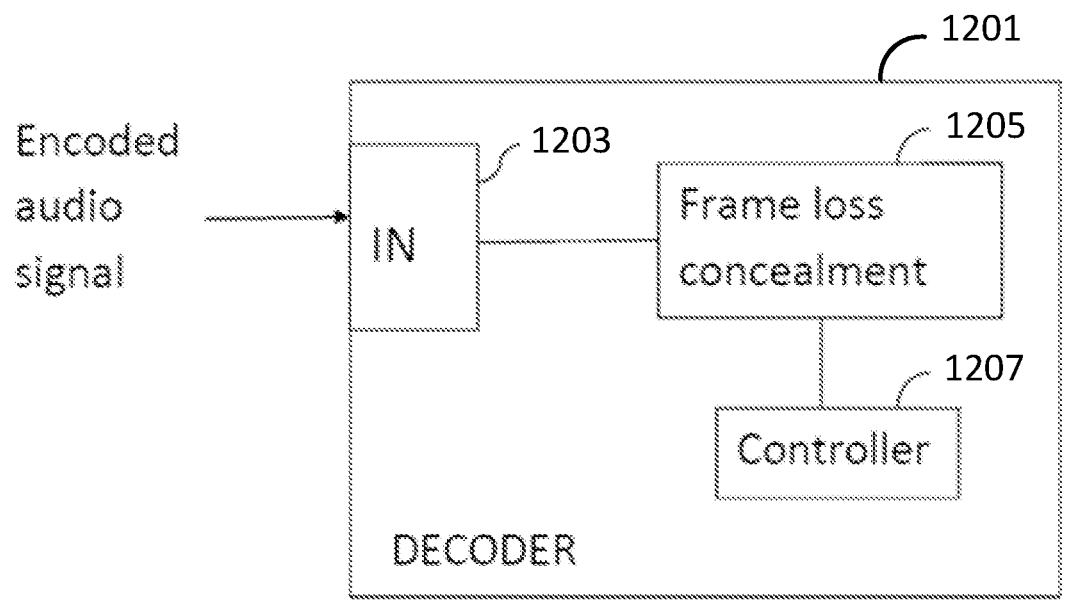
FIG. 12 illustrates an example of a decoder apparatus in accordance with some embodiments of inventive concepts.
Figure 13:
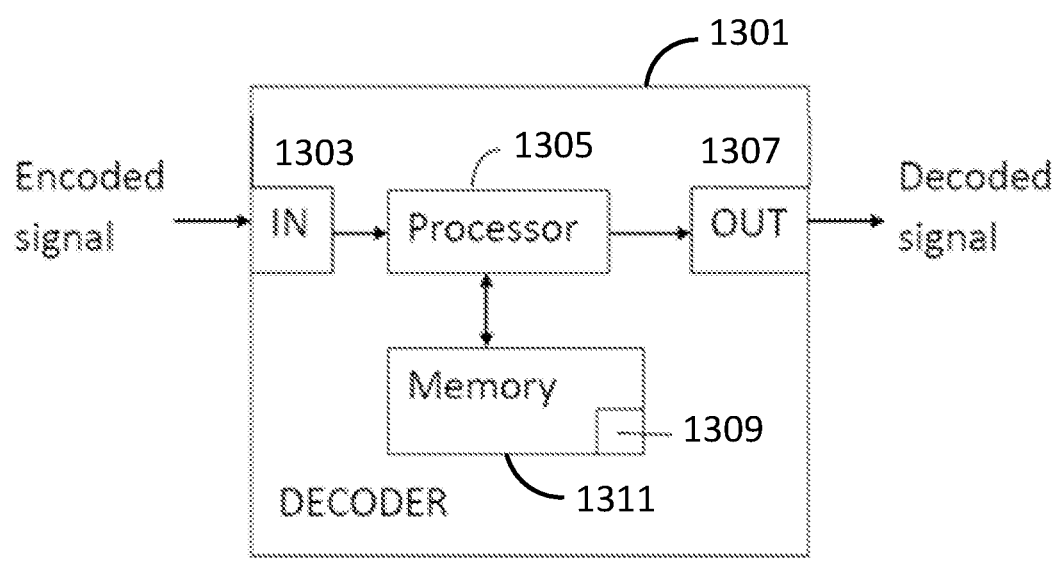
FIG. 13 illustrates another example of a decoder apparatus in accordance with some embodiment of inventive concepts.

The decoder apparatus may consist of two units or may be part of the PLC illustrated in FIG. 2 or the decoder apparatus illustrated in FIG. 12 and FIG. 13. The decoder (1201, 1301) may update the spectral shape and frame energy during error free operation. The decoder (1201, 1301) may use the saved spectral shapes and frame energies during the first frame error to generate the long-term spectral estimate that is to be used during error concealment. A third component of the decoder (1201, 1301) may also be used to determine a frequency band decay to be applied in the PLC reconstruction, such as when there is significant drop in energy.

The reuse of MDCT coefficients typically only generates one spectral shape per frame. Having two spectral shapes during the first error frame may be achieved by generating one spectral shape estimate for each good frame and by also saving the spectral shape estimate from the previous good frame. To obtain the correct level of the spectral estimate, the windowed energy of the corresponding PLC-prototype frame may be saved at the end of the good frame processing in a MDCT based decoder. A good frame means a correctly received error free frame, while a bad frame means an erased, i.e. a lost or corrupted, frame.

During the lost frame, the second unit uses the two saved spectral shapes and frame energies to generate two spectral estimates corresponding to the ones that would have been generated by the two short FFTs. This reduces complexity and processor overhead. Based on the saved shapes and energies, the third unit may establish the decay factors to be used for each frequency band, in the PLC reconstruction of the lost frame. After this the normal processing of the Phase ECU is continued as before, see international patent application no. WO2014123471 (Appendix 1) or 3GPP TS 26.447 V15.0.0 clause 5.4.3.5.

The techniques described herein are not limited to using spectral estimation from MDCT as described above. The techniques can be adapted to work with any other spectral estimation technique that is used in a codec.

The following describes the functions of using the MDCT in more detail.

To obtain the MDCT coefficients, the MDCT is taken over a 20 ms window with a 10 ms advance. When using one transform, e.g. MDCT, to make a sub-band estimate of another transform, e.g. FFT. It is important to make the grouping into sub-bands over the correct coefficients. The PLC prototype frame saved after good frames is 16 ms in length and the transient detector sub band analysis module uses two short FFT of length 4 ms—that is one quarter of the PLC prototype frame. The actual length of these items depends on the sampling frequency used and can be from 8 kHz to 48 kHz. These lengths affect the number of spectral bins in each transform. The two short FFT analysis results are used to determine a conversion factor µ as described below.

Spectral Shape History Update in Good Frames

For the transient analysis, the Phase ECU may use a history of the MDCT based spectral shape and MDCT-synthesis windowed energies to build an image of how the input signal has evolved over time. The spectral shape is calculated based on the decoded MDCT coefficients which holds a spectral representation of the decoded signal. The spectral shape consists of sub-bands where the number of sub-bands, $N_{grp}$, depends on the sampling frequency as seen in Table 1.

TABLE 1

Phase ECU Number of Sub-Bands table

| $f_s$ | $N_{grp}$ |
|---|---|
| 8000 | 4 |
| 16000 | 5 |
| 24000 | 6 |
| 32000 | 7 |
| 44100, 48000 | 8 |

For good frames, that is when the bad frame indicator indicates the frame is not a bad frame (e.g., BFI=0), the values of spectral shape and frame energy may be updated. These steps are illustrated in the flowchart in FIG. 3. Turning to FIG. 3, at operation 301, a determination is made as to whether BIF=0. Note that the parameters may only be calculated for the current frame. When the frame before was a good frame, the values saved during the last frame may be moved to the buffers designated as second last frames (i.e., a $shape_{oold}$ buffer(s)). The spectral shape $shape_{old}(k)$ from the last frame are moved and saved in a second buffer $shape_{oold}(k)$ as follows in operation 303:

$$shape_{oold}(k) = shape_{old}(k), 0 \le k < N_{grp}. \quad (1)$$

Similarly, in operation 305, the last frames energy is moved to a second buffer $E\_w_{oold}$ as:

$$E\_w_{oold} = E\_w_{old}. \quad (2)$$

These updates may be followed by calculation of new values of spectral shape $shape_{old}(k)$ and frame energy $E\_w_{old}$ for the last frame buffers in operations 307 and 309. Table 2 illustrates how the bins of the current MDCT coefficients may be divided among the sub-bands. The table entries in Table 2 show start coefficients of each sub-band for an embodiment that may be used in the methods described in international application WO 2014/123471. Other sub-bands may be used for other embodiments.

TABLE 2

Phase ECU MDCT Sub-Bands start bin table

| MDCT_grp_bins (=grp_bin(k)) | {4, 14, 24, 44, 84, 164, 244, 324, 404, 484} |
|---|---|

It may be desirable to have the sub-band based spectral shape in the range [0, . . . 1]. This may be achieved by first calculating the total magnitude of the MDCT coefficients (q_d(n)) as:

$$shape\_tot = \sum_{n=0}^{N_{MDCT}-1} q\_d(n)^2 \quad (3)$$

Where $N_{MDCT}$ is the number of MDCT coefficients and depends on the sampling frequency such as the sampling frequencies illustrated in Table 3.

TABLE 3

Number of MDCT coefficients for different sampling frequencies.

| $f_s$ | $N_{MDCT}$ |
|---|---|
| 8000 | 80 |
| 16000 | 160 |
| 24000 | 240 |
| 32000 | 320 |
| 44100, 48000 | 480 |

The calculated value for shape_tot may then be used to normalize the spectral shape of each sub-band which may be determined as $$shape_{old}(k) = \frac{1}{shape\_tot} \sum_{n=grp\_bin(k)}^{grp\_bin(k+1)-1} q\_d(n)^2, 0 \le k < N_{grp} \quad (4)$$

which forms the spectral shape estimate for the new value of the last frame. Note that there may be some MDCT coefficients that are not assigned to the spectral shape. This is a result of not using the DC bin in the corresponding short FFTs.

To be able to use the spectral shape during reconstruction, the frame energy may be calculated based on the windowed prototype frame. This may be determined as:

$$E\_w_{old} = \sum_{n=0}^{L_{prot}-1} (w_{whr}(n) \cdot x_{prev}(n))^2 \quad (5)$$

where $w_{whr}$ may be (especially for long term background approximation estimation) the long FFT spectral analysis window, $x_{prev}$ is the Phase ECU time domain prototype signal as used to create a substitution for a potentially upcoming lost frame, and $L_{prot}$ is the number of samples in the $x_{prev}$ signal which also corresponds to the length of the time window $w_{whr}$.

In an alternative embodiment, the overall spectral approximation performance may be balanced between providing a good background estimate and a good estimate for transient offset detection. This balancing may be done in an embodiment by optionally altering the applied $w_{whr}$ window to differ from the long/16 ms FFT spectral analysis window. One possible approach to alter this is to shorten the window and shift the energy estimation window towards the future so that the energy estimation is further time aligned with the energy content of the short (4 ms) FFT windows. This approach also reduces the complexity of energy alignment calculations. For example, $E\_w_{old}$ may be reduced to the windowed energy of the 3*L_prot/4 (12 ms) most recent synthesized samples, or even the L_prot/2 (8 ms) most recent samples. This may balance the spectral approximation between background estimation (targeting the overall spectral period of 16 ms) and transient offset estimation (targeting the last 4 ms)).

Figure 4:
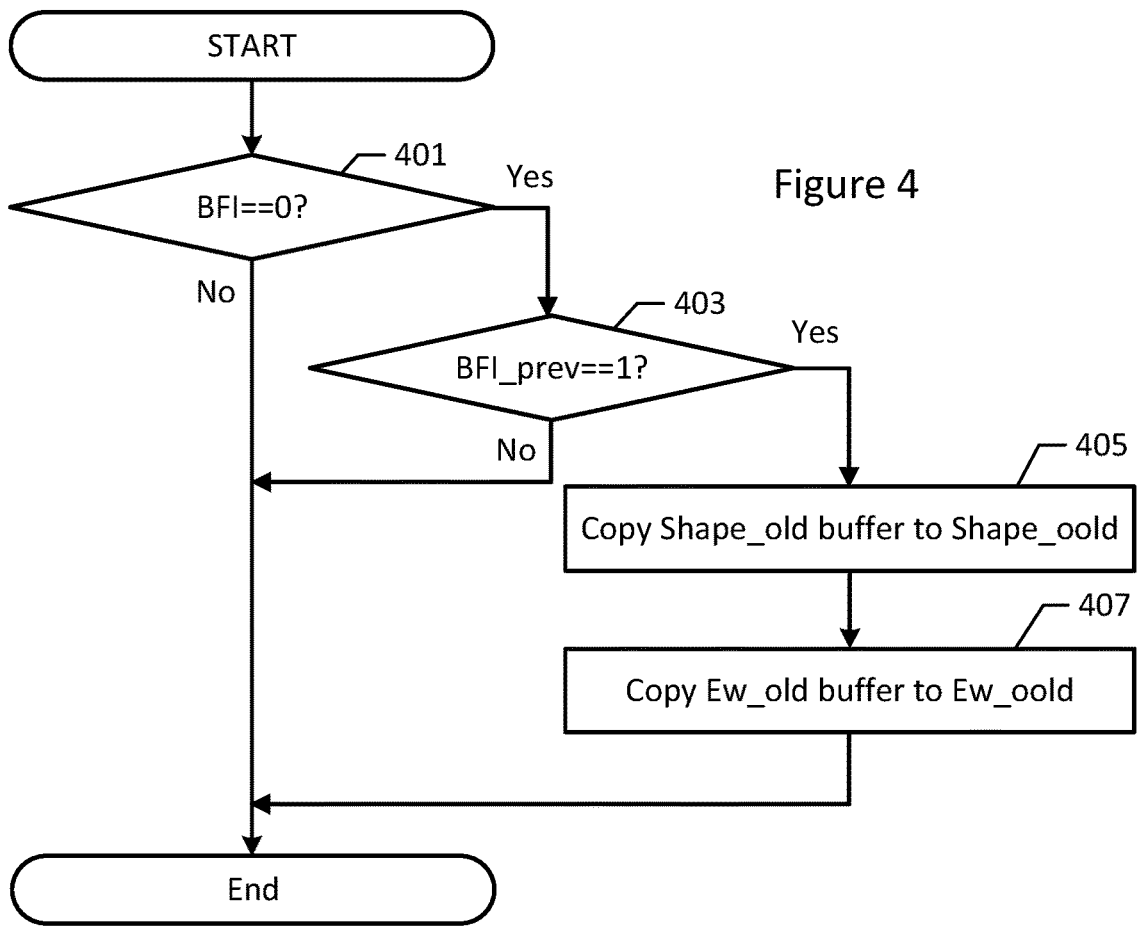
FIG. 4 is a flowchart of operations and methods that can be performed to update spectral parameters during good frames in accordance with some embodiments of inventive concepts.

Turning to FIG. 4, to avoid the use of old values in the secondary buffers after a bad frame or a burst of bad frames, the $shape_{oold}(k)$ and $E\_w_{oold}$ states of the spectral shape and frame energy may be re-initialized. Therefore, in the case were a good frame BFI=0 (as illustrated by operation 401) is preceded by a bad frame $BFI_{prev}=1$ (as illustrated by operation 403) the calculated values are copied to the secondary buffers as described in the first equations (1) and (2) respectively in operations 405 and 407.

Conversion of Spectral Shape into Short FFT Sub-Band Energies

The transient analysis may use the saved spectral shape and frame energies to analyze how the sub-band energies are evolving over time. These values may be used for two things, the first is for sub-band transient detector and the second is for forming a long-term average $\overline{E}_{tran}$ that may be used to adjust sub-band energies during burst errors. These values form a basis for calculating signal modification values that are used during error bursts.

TABLE 4

Phase ECU FFT Sub-Bands start bin table

| PhECU_grp_bins (start bins, indexing starts from 0) | {1, 3, 5, 9, 17, 33, 49, 65, 81, 97} |
|---|---|

Figure 5:
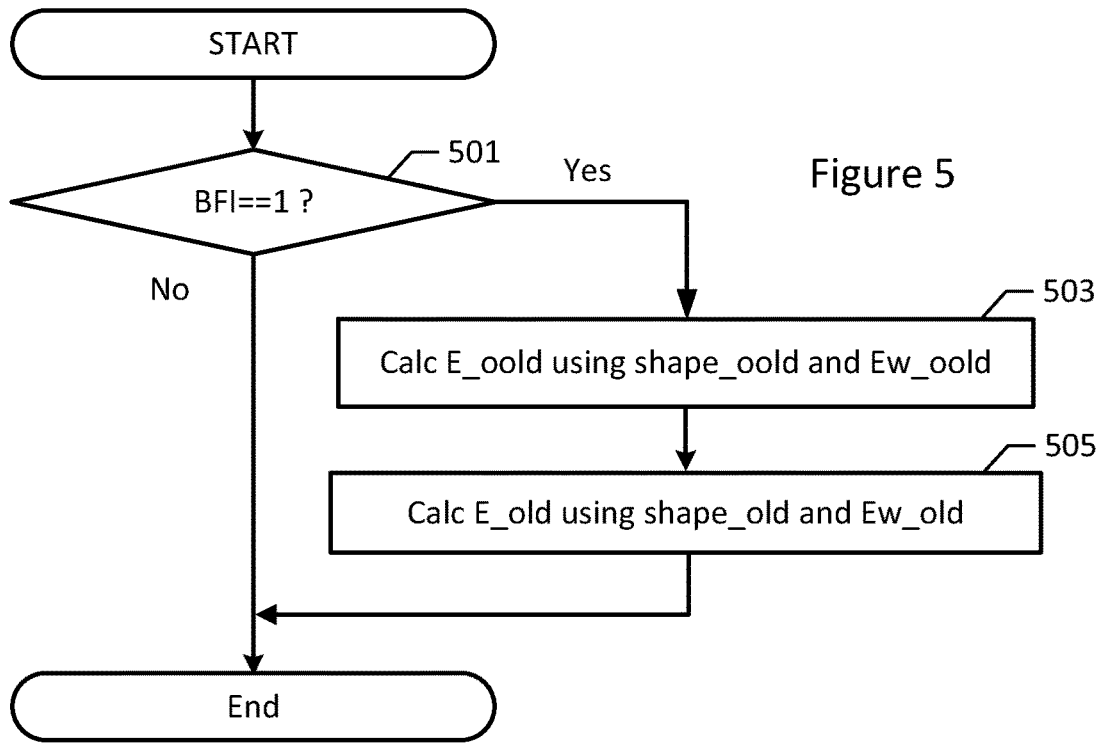
FIG. 5 is a flowchart for updating spectral parameters during bad frames in accordance with some embodiments of inventive concepts.

The spectral shapes and frame energies are used to generate the approximations of sub-band energies for the two last error free frames. This is illustrated in the flow chart of FIG. 5 when the bad frame indicator indicates a bad frame (i.e. BFI=1) at operation 501. Turning to FIG. 5, the first frame represents the sub-band frame energies before the last frame and may be generated in operation 503 by:

$$E_{oold}(k) = \mu \cdot shape_{oold}(k) \cdot E\_w_{oold}, \quad 0 \leq k < N_{grp} \quad (6)$$

The second sub-frame frame energies are for the last frame and may be generated in operation 505 by:

$$E_{old}(k) = \mu \cdot shape_{old}(k) \cdot E_{w_{old}}, \quad 0 \leq k < N_{grp} \quad (7)$$

where $\mu$ is a scalar constant that depends on the sampling frequency and handles the conversion of the MDCT based spectral shape to an approximation of an FFT based spectral analysis, $\overline{E}_{tran}$. An example of $\mu$ for various $f_s$ frequencies is shown in Table 5.

TABLE 5

Phase ECU MDCT to FFT spectral shape conversion factor u table

| $f_s$ | $\mu$ |
|---|---|
| 8000 | 1.9906 |
| 16000 | 4.0445 |
| 24000 | 6.0980 |
| 32000 | 8.1533 |
| 44100, 48000 | 12.2603 |

The conversion factor $\mu$ may be calculated off-line and depends on the MDCT-window and the window used in the FFT for which it serves as an approximation for during lost frame reconstruction. To find these coefficients, the PLC should be run with both methods (original FFT analysis and the reduced complexity approximation of the FFT using the MDCT) active to calculate the conversion factor(s). A convenient method for calculating the conversion factor is to use sine waves. One wave may be used in the center of each group interval and the calculation may be started with the coefficient set to one. The correct value may be calculated by comparing the two methods. Note that the bins in Table 4 show the bin grouping for an FFT with an analysis length that is a quarter of the one used for the spectral analysis used by the PLC on the prototype frame, i.e. if the spectral analysis is made using a 16 ms FFT, the bin grouping is for a 4 ms spectral analysis.

Figure 6:
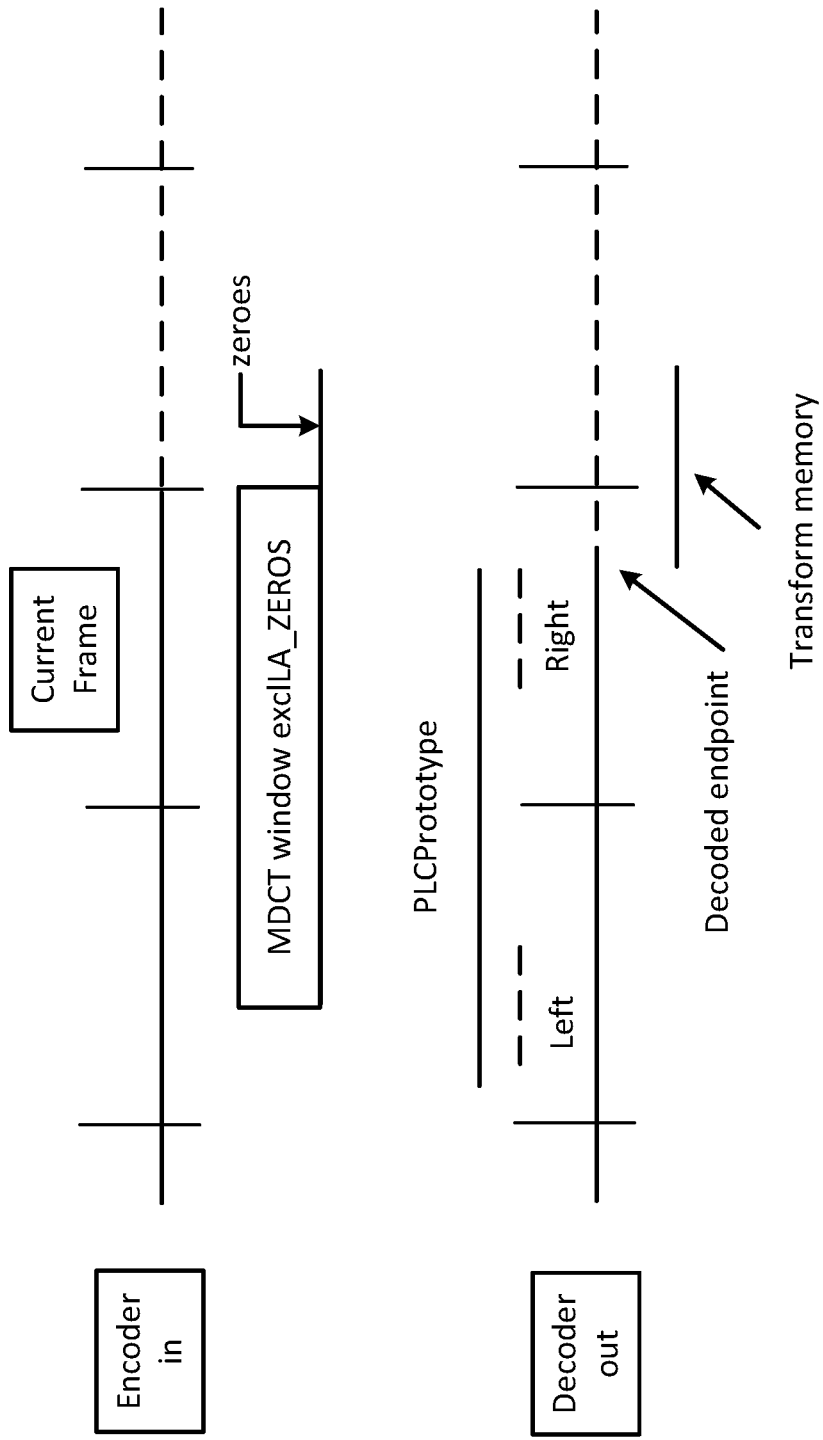
FIG. 6 is a signal diagram of a PLC Prototype buffer and the location of the short FFT's for transient detection if the next frame would be lost.

FIG. 6 illustrates an overview of how the framing and the related Frame structure of the MDCT coder is applied for an asymmetrically located MDCT window and with a segment of look ahead zeros—LA_ZEROS. Note that the signal diagram shows that a frame is only decoded up to a point of ¾ of the current frame due to the use of look ahead zeros (LA_ZEROS-⅜ of the frame length) in the MDCT window. The framing affects which part of the current frame is possible to decode and therefore affects the position of the PLC prototype frame that is saved and used in case the next frame is lost.

FIG. 6 also illustrates the difference in length of the involved transforms used in the embodiment. Even in MDCT with a length twice the length of the encoded frame each spectral point is represented with two coefficients (compare with FFT where an N sample results in N complex numbers—that is 2 N scalar values) where one may be a time reversal of the other.

Figure 7:
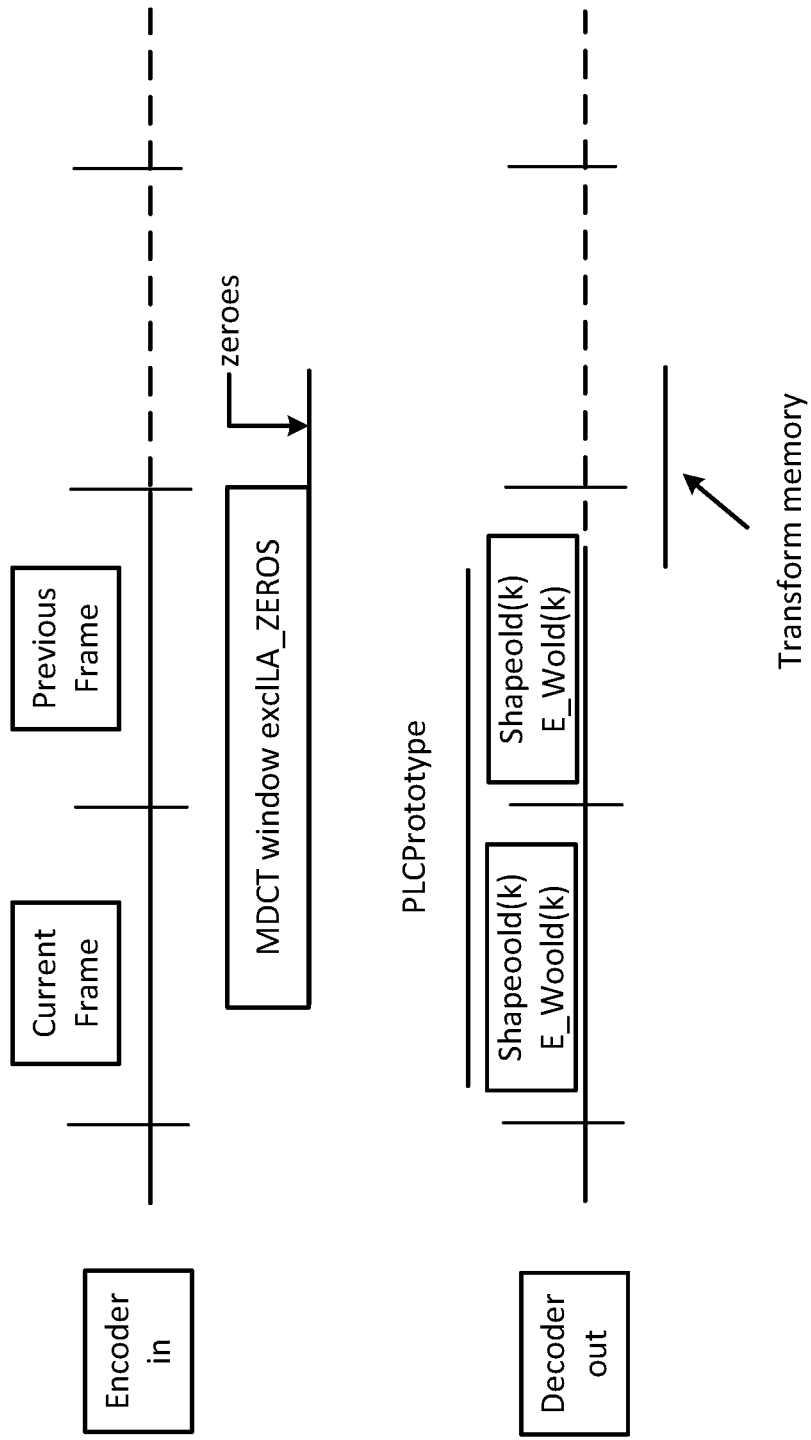
FIG. 7 is a signal diagram of a PLC Prototype buffer and the location of the spectral shape and frame energies for transient detection if the next frame would be lost in accordance with some embodiments.

FIG. 7 illustrates an overview of how the framing and the related frame structure of the MDCT coder is applied to determine the sub-band energies and the spectral shapes as described above. FIG. 7 illustrates the current frame and the previous frame being good frames and shows where in relation to the coding process the method of FIGS. 3 and 9-11 may be performed.

Figure 8:
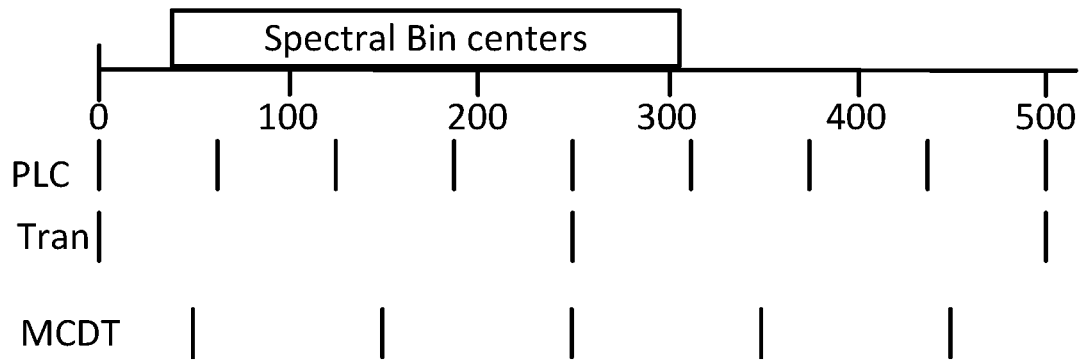
FIG. 8 is a diagram illustrating the difference in frequency resolution and the bin center points for the different PLC related transforms.
Figure 10:
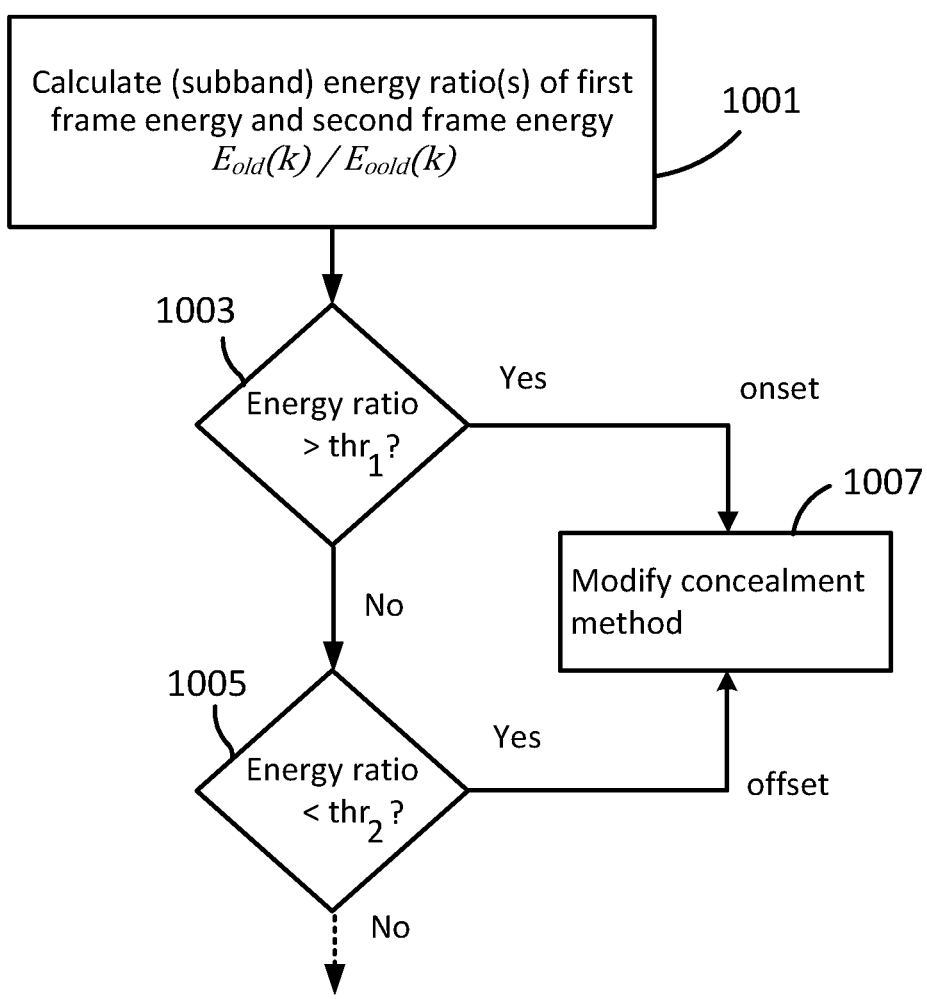
FIG. 10 is a flowchart illustrating modifying a concealment method in accordance with some embodiments of inventive concepts.

FIG. 8 illustrates a graphical representation of the different spectral representations. The PLC spectral analysis is made on a 16 ms time segment—this results in a inter bin distance of 62.5 Hz. From a N point FFT one gets N/2+1 bins where the start point is 0 Hz and the last is fs/2 (half the sampling frequency). The same applies for the transient analysis where the short FFTs that are to be replaced—the difference is that the time window is 4 ms—this results in inter bin distance of 250 Hz. For the MDCT which is made over a 20 ms time segment—the inter bin distance becomes 100 Hz after grouping the time and time reversed coefficients for M MDCT and length of M MDCT there are M/4 coefficients after grouping. The MDCT does not have a DC or fs/2 coefficients, so the simplest representation is to have a half bin offset as shown in FIG. 8.

In an embodiment, these estimates of the spectral estimates for the transient analysis as described above may be used to replace the spectral estimates used in the transient calculation and concealment adaptation as described in international patent application no. WO2014123471 (see Appendix 1). These estimates may also be used in other situations where spectral estimates are used such as in 3GPP TS 25.447 V. 15.0.0.

Figure 9:
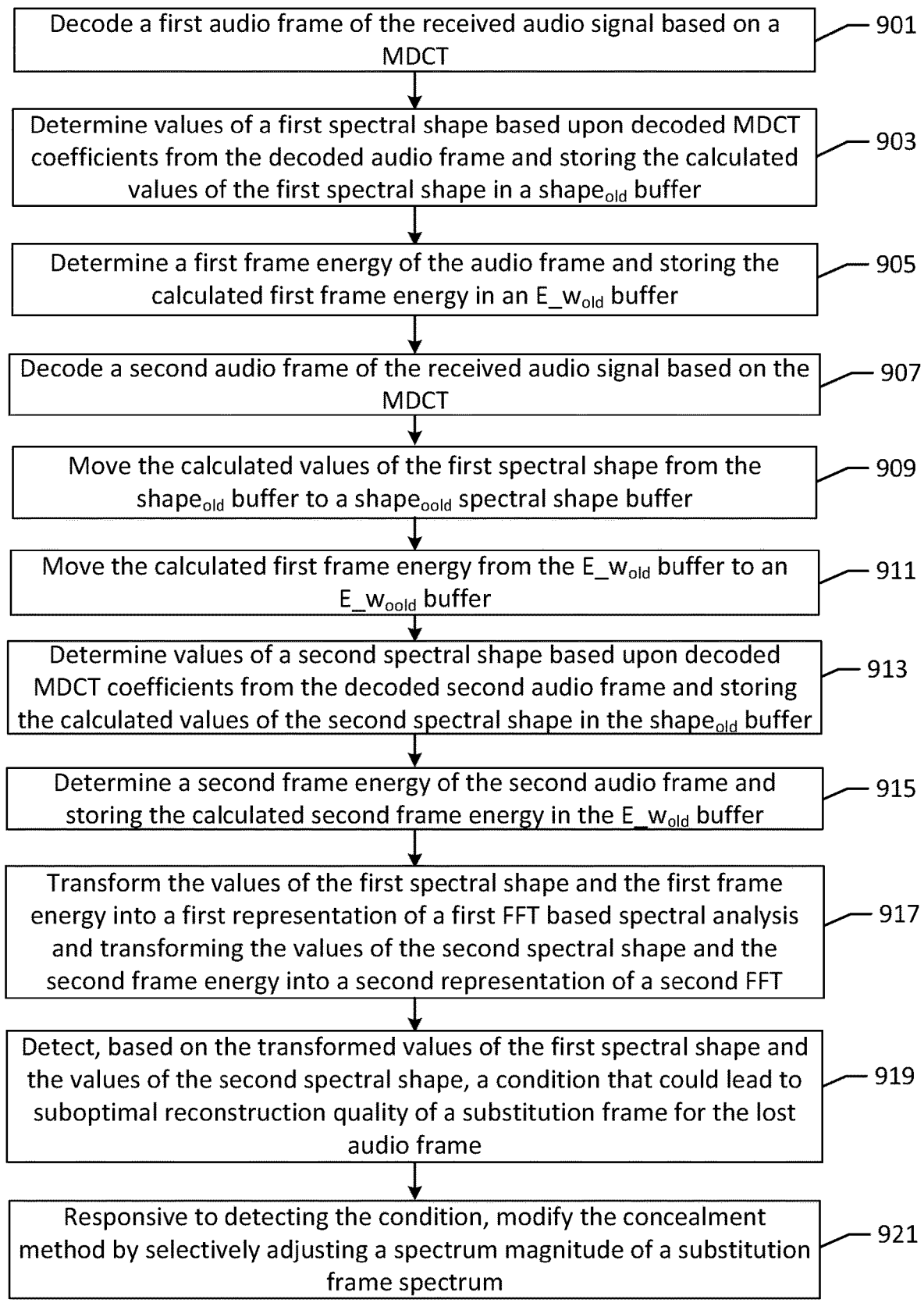
FIG. 9 is a flowchart illustrating modifying a concealment method in accordance with some embodiments of inventive concepts.

For example, turning to FIG. 9, a decoder (1201, 1301) may decode a first audio frame of a received audio signal based on a MDCT in operation 901. In operation 903, the decoder (1201, 1301) may determine values of a first spectral shape based upon MDCT coefficients from the decoded first audio frame and store the determined values of the first spectral shape in a shape$_{old}$ buffer, the first spectral shape comprising a number of sub-bands. In operation 905, the decoder (1201, 1301) may determine a first frame energy of the first audio frame and store the determined first frame energy in an E_w$_{old}$ buffer.

In operation 907, the decoder (1201, 1301) may decode a second audio frame of the received audio signal based on the MDCT. In operation 909, the decoder (1201, 1301) may move the determined values of the first spectral shape from the shape$_{old}$ buffer to a shape$_{oold}$ buffer. Operation 909 may correspond to operation 303 of FIG. 3. In operation 911, the decoder (1201, 1301) may move the determined first frame energy from the E_w$_{old}$ buffer to an E_w$_{oold}$ buffer. Operation 911 may correspond to operation 305 of FIG. 3.

In operation 913, the decoder (1201, 1301) may determine values of a second spectral shape based upon decoded MDCT coefficients from the decoded second audio frame and store the determined values of the second spectral shape in the shape old buffer, the second spectral shape comprising the number of sub-bands. In operation 915, the decoder (1201, 1301) may determine a second frame energy of the second audio frame and store the calculated second frame energy in the E_w$_{old}$ buffer.

In operation 917, the decoder (1201, 1301) may transform the values of the first spectral shape and the first frame energy into a first representation of a first fast Fourier transform, FFT, based spectral analysis and transform the values of the second spectral shape and the second frame energy into a second representation of a second FFT spectral analysis.

In operation 919, the decoder (1201, 1301) may detect, based on the transformed values of the first spectral shape and the values of the second spectral shape, a condition that could lead to suboptimal reconstruction quality of a substitution frame for the lost audio frame when the concealment method is used to create the substitution frame.

In operation 921, the decoder (1201, 1301), responsive to detecting the condition, may modify the concealment method by selectively adjusting a spectrum magnitude of a substitution frame spectrum.

In one embodiment, the spectral estimates describe above may be used to reduce the complexity and processing overhead in the transient calculation and concealment adaptation such as described in international patent application no. WO2014123471 and 3GPP TS 25.447 V. 15.0.0 clause 5.4.3.5. The E$_{oold}$(k) and E$_{old}$(k) are used to calculate an energy ratio estimate and transient detection may be done using the bins of E$_{oold}$(k) and E$_{old}$(k). For example, turning to FIG. 10, in operation 1001, the sub-band energies of E$_{oold}$(k) and E$_{old}$(k) may be determined as described above. The frequency group selective transient detection can now be based on the band-wise ratio between the respective band energies of the frames associated with E$_{oold}$(k) and E$_{old}$(k):

$$R_{old\backslash oold, band}(k) = \frac{E_{old}(k)}{E_{oold}(k)}. \qquad i$$

Other ratios may be used.

It is to be noted that the interval $I_k=[m_{k-1}+1, \ldots m_k]$ corresponds to the frequency band $$B_k = \left[\frac{m_{k-1}+1}{N_{part}} \cdot f_s, \ldots, \frac{m_k}{N_{part}} \cdot f_s\right],$$

where $f_s$ denotes the audio sampling frequency, and $N_{part}$ corresponds to the size of the frame. The lowest lower frequency band boundary $m_0$ can be set to 0 but may also be set to a DFT index corresponding to a larger frequency in order to mitigate estimation errors that grow with lower frequencies. The highest upper frequency band boundary $m_K$ can be set to $N_{part}/2$ but is preferably chosen to correspond to some lower frequency in which a transient still has a significant audible effect.

The ratios may be compared to certain thresholds. For example, a respective upper threshold for (frequency selective) onset detection 1003 and a respective lower threshold for (frequency selective) offset detection 1005 may be used. When the energy ratio is above the upper threshold or below the lower threshold, the concealment method may be modified in operation 1007. These operations correspond to operation 919 of FIG. 9.

Figure 11:
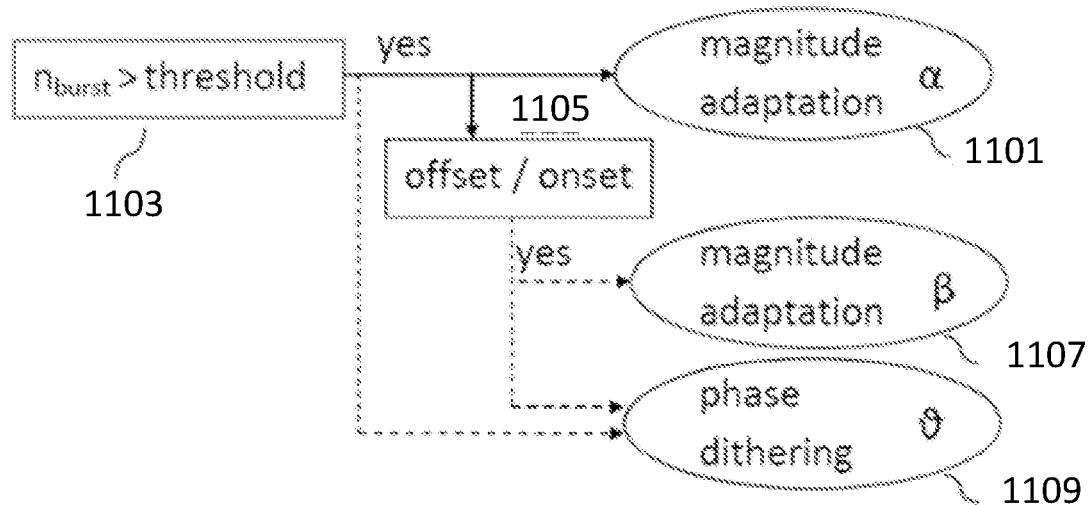
FIG. 11 is a flowchart illustrating modifying a concealment method in accordance with some embodiments of inventive concepts.

An example of modifying the concealment method of operation 921 of FIG. 9 is illustrated in FIG. 11. In this embodiment of concealment method modification, the magnitude and phase of a substitution frame spectrum is determined. The magnitude is modified by means of scaling with two factors $\alpha(m)$ and $\beta(m)$ and the phase is modified with an additive phase component $\vartheta(m)$. This leads to the calculation of the substitution frame:

$$Z(m) = \alpha(m) \cdot \beta(m) \cdot Y(m) \cdot e_k^{j(\theta + \vartheta(m))} \qquad 1.$$

where Z(m) is the substitution frame spectrum, $\alpha(m)$ is a first magnitude attenuation factor, $\beta(m)$ is a second magnitude attenuation factor, Y(m) is a protype frame, $\theta_k$ is a phase shift, and $\vartheta(m)$ is an additive phase component.

In this embodiment, the number $n_{burst}$ of observed frame losses in a row is determined where a burst loss counter is incremented with one upon each frame loss and reset to zero upon the reception of a valid frame. Magnitude adaptation, in operation 1101, is preferably done if the burst loss counter $n_{burst}$ exceeds some threshold thr$_{burst}$, e.g. thr$_{burst}$=3 as determined in operation 1103. In that case a value smaller than 1 is used for the attenuation factor, e.g. $\alpha(m)=0.1$. A further adaptation with regards to the magnitude attenuation factor may be done in case a transient has been detected based on that the indicator $R_{old\backslash oold,band}(k)$ or alternatively $R_{old\backslash oold}(m)$ or $R_{old\backslash oold}$ have passed a threshold as determined in operation 1105. In that case a suitable adaptation action in operation 1107 is to modify the second magnitude attenuation factor $\beta(m)$ such that the total attenuation is controlled by the product of the two factors $\alpha(m) \cdot \beta(m)$.

$\beta(m)$ may be set in response to an indicated transient. In case an offset is detected the factor $\beta(m)$ may be chosen to reflect the energy decrease of the offset. A suitable choice is to set β(m) to the detected gain change:

$$\beta(m) = \sqrt{R_{old\backslash oold, band}(k)} \text{ for } m \in I_k, k=1\ldots K$$

In case an onset is detected it is rather found advantageous to limit the energy increase in the substitution frame. In that case the factor can be set to some fixed value of e.g. 1, meaning that there is no attenuation but not any amplification either.

Examples of the phase dithering in operation 1109 are in international patent application no. WO2014123471 (see Appendix 1) and in 3GPP_TS_26.447_v.15.0.0_2018_06, clause 5.4.3.5.3 and need not be described herein in detail.

FIG. 12 is a schematic block diagram of a decoder that may be used according to the embodiments. The decoder 1201 comprises an input unit 1203 configured to receive an encoded audio signal. FIG. 11 illustrates the frame loss concealment by a logical frame loss concealment-unit 1205, which indicates that the decoder is configured to implement a concealment of a lost audio frame, according to the above-described embodiments. Further the decoder comprises a controller 1207 for implementing the embodiments described above, including the operations illustrated in FIGS. 3-5 and 9-11, and/or operations discussed below with respect to respective Example Embodiments.

For example, the controller 1207 may be configured to determine properties of the previously received and reconstructed audio signal or in the statistical properties of the observed frame losses for which the substitution of a lost frame according to the original, non-adapted Phase ECU method provide relatively reduced quality. In case such a condition is detected, the controller 1207 may be configured to modify the element of the concealment methods according to which the substitution frame spectrum is calculated by selectively adjusting the phases or the spectrum magnitudes as described above and output the audio frame towards a receiver for playback. The receiver may be a device having a loudspeaker, a loudspeaker device, a phone, etc.

The decoder may be implemented in hardware. There are numerous variants of circuitry elements that can be used and combined to achieve the functions of the units of the decoder. Such variants are encompassed by the embodiments. Particular examples of hardware implementation of the decoder is implementation in digital signal processor (DSP) hardware and integrated circuit technology, including both general-purpose electronic circuitry and application-specific circuitry.

The decoder described herein could alternatively be implemented e.g. as illustrated in FIG. 13, i.e. by one or more of a processor 1305 and adequate software 1309 with suitable storage or memory 1311 therefore, in order to reconstruct the audio signal, which includes performing audio frame loss concealment according to the embodiments described herein, as shown in FIGS. 3-5 and 9-11. The incoming encoded audio signal is received by an input (IN) 1303, to which the processor 1305 and the memory 1311 are connected. The decoded and reconstructed audio signal obtained from the software is outputted from the output (OUT) 1307 towards a receiver for playback. As discussed herein, operations of the decoder 1301 may be performed by processor 1305. Moreover, modules may be stored in memory 1311, and these modules may provide instructions so that when instructions of a module are executed by processor 1305, processor 1305 performs respective operations.

The technology described above may be used e.g. in a receiver, which can be used in a mobile device (e.g. mobile phone, laptop) or a stationary device, such as a personal computer.

It is to be understood that the choice of interacting units or modules, as well as the naming of the units are only for exemplary purpose, and may be configured in a plurality of alternative ways in order to be able to execute the disclosed process actions.

ABBREVIATIONS

At least some of the following abbreviations may be used in this disclosure. If there is an inconsistency between abbreviations, preference should be given to how it is used above. If listed multiple times below, the first listing should be preferred over any subsequent listing(s).

| Abbreviation | Explanation |
| --- | --- |
| ADC | Analog to Digital Converter |
| BFI | Bad Frame Indicator |
| BFI_prev | Bad Frame Indicator of previous frame |
| DAC | Digital to Analog Converter |
| FFT | Fast Fourier Transform |
| MDCT | Modified Discrete Cosine Transform |

REFERENCES

[1] International patent application no. WO2014123470
[2] International patent application no. WO2014123471
[3] 3GPP TS 26.445 V15.1.0 (clauses 5.3.2.2 and 6.2.4.1), hereby incorporated by reference in its entirety
[4] 3GPP TS 26.447 V15.0.0 (clause 5.4.3.5), hereby incorporated by reference in its entirety

LISTING OF EXAMPLE EMBODIMENTS

Example Embodiments are discussed below. Reference numbers/letters are provided in parenthesis by way of example/illustration without limiting example embodiments to particular elements indicated by reference numbers/letters.

1. A method by a computer processor for controlling a concealment method for a lost audio frame of a received audio signal, the method comprising:
   decoding (901) a first audio frame of the received audio signal based on a modified discrete cosine transform, MDCT;
   determining (307-309, 903) values of a first spectral shape based upon decoded MDCT coefficients from the decoded audio frame and storing the calculated values of the first spectral shape in a shape old buffer, the first spectral shape comprising a number of sub-bands;
   determining (905) a first frame energy of the audio frame and storing the calculated first frame energy in an $E\_w_{old}$ buffer;
   decoding (907) a second audio frame of the received audio signal;
   moving (303, 909) the calculated values of the first spectral shape from the $shape_{old}$ buffer to a $shape_{oold}$ buffer;
   moving (305, 911) the calculated first frame energy from the $E\_w_{old}$ buffer to an $E\_w_{oold}$ buffer;

determining (307-309, 913) values of a second spectral shape based upon decoded MDCT coefficients from the decoded second audio frame and storing the calculated values of the second spectral shape in the shape$_{old}$ buffer the second spectral shape comprising the number of sub-bands;

determining (915) a second frame energy of the second audio frame and storing the calculated second frame energy in the E_w$_{old}$ buffer;

transforming (917) the values of the first spectral shape and the first frame energy into a first representation of a first fast Fourier transform, FFT, based spectral analysis and transforming (917) the values of the second spectral shape and the second frame energy into a second representation of a second FFT spectral analysis;

detecting (919), based on the first representation of the first fast FFT and the second representation of a second FFT, a condition that could lead to suboptimal reconstruction quality of a substitution frame for the lost audio frame when the concealment method is used to create the substitution frame for the lost audio frame; and responsive to detecting the condition, modifying (921) the concealment method by selectively adjusting a spectrum magnitude of a substitution frame spectrum.

2. The method of Embodiment 1 wherein determining the values of the first spectral shape based upon decoded MDCT coefficients comprises:
   determining (307) a total magnitude of the MDCT coefficients;
   normalizing each sub-band value of the first spectral shape; and
   storing each normalized sub-band value as a value of the values of the first spectral shape.

3. The method of Embodiment 2 wherein the total magnitude of the MDCT coefficients is determined in accordance with $$\text{shape\_tot} = \sum_{n=0}^{N_{MDCT}-1} q\_d(n)^2$$

where shape_tot is the total magnitude of the MDCT coefficients, $N_{MDCT}$ is a number of MDCT coefficients and depends on a sampling frequency, and q_d(n) are the MDCT coefficients 4. The method of any of Embodiments 2-3 where the normalizing of each sub-band is normalized in accordance with $$\text{shape}_{old}(k) = \frac{1}{\text{shape\_tot}} \sum_{n=grp\_bin(k)}^{grp\_bin(k+1)-1} q\_d(n)^2, \ 0 \le k < N_{grp}$$

where shape$_{old}$(k) is a spectral shape of a sub-band (k), shape_tot is the total magnitude of the MDCT coefficients, q_d(n) are the MDCT coefficients, $N_{grp}$ is a number of the MDCT coefficients, grp_bin(k) is a start index for the MDCT coefficients in sub-band(k), and $N_{grp}$ is the number sub-bands.

5. The method of any of Embodiments 1-4 wherein frame energy of the first frame energy and the second frame energy is determined in accordance with $$E\_w_{old} = \sum_{n=0}^{L_{prot}-1} (w_{whr}(n) \cdot x_{prev}(n))^2$$

where E_w$_{old}$ is the frame energy, $w_{whr}$ is along FFT spectral analysis window, $x_{prev}$ is a time domain prototype signal used to create a substitution for a potentially upcoming lost frame, and $L_{prot}$ is a number of samples in the $x_{prev}$ signal prey 6. The method of any of Embodiments 1-5, wherein transforming the values of the first spectral shape and the first frame energy into the first representation of a first fast FFT based spectral analysis and transforming the values of the second spectral shape and the second frame energy into a second representation of a second FFT spectral analysis comprises applying a conversion factor to the values of the first spectral shape and the first frame energy and to the values of the second spectral shape and the second frame energy.

7. The method of Embodiment 6 wherein the conversion factor depends on a sampling frequency of the decoding.

8. The method of any of Embodiments 4-7, further comprising:
   transforming the values of the first spectral shape and the first frame energy into the first representation of a first fast FFT based spectral analysis and transforming the values of the second spectral shape and the second frame energy into a second representation of a second FFT spectral analysis in accordance with $$E_{oold}(k) = \mu \cdot \text{shape}_{oold}(k) \cdot E\_w_{oold}, \ 0 \le k < N_{grp}$$

and $$E_{old}(k) = \mu \cdot \text{shape}_{old}(k) \cdot E_{w_{old}}, \ 0 \le k < N_{grp}$$

where $E_{oold}(k)$ is the first representation, $\mu$ is the conversion factor, shape$_{oold}$(k) is a spectral shape of a sub-band (k) of the first spectral shape, E_w$_{oold}$ is the first frame energy, $E_{old}(k)$ is the second representation, shape$_{old}$(k) is a spectral shape of a sub-band (k) f the second spectral shape, E_w$_{old}$ is the second frame energy, and $N_{grp}$ is the number of sub-bands.

9. The method of Embodiment 8 further comprising:
   determining (1105) if a sub-band transient is above a threshold value based on $E_{oold}(k)$ and $E_{old}(k)$;
   responsive to a sub-band transient being above the threshold value, modifying the concealment method by selectively adjusting (1107) the spectrum magnitude of the substitution frame spectrum.

10. The method of Embodiment 9 wherein the substitution frame spectrum is calculated according to an expression of $$Z(m) = \alpha(m) \cdot \beta(m) \cdot Y(m) \cdot e_k^{j(\theta + \vartheta(m))}$$

and adjusting the spectrum magnitude comprises adjusting β(m) (1107), where Z(m) is the substitution frame spectrum, α(m) is a first magnitude attenuation factor, β(m) is a second magnitude attenuation factor, Y(m) is a protype frame, $\theta_k$ is a phase shift, and ϑ(m) is an additive phase component.

11. The method of any of Embodiments 1-10 further comprising:
receiving a bad frame indicator (403, 501);
responsive to receiving the bad frame indicator, flushing the shape$_{oold}$ buffer and the E_w$_{oold}$ energy buffer;
receiving a new audio frame of the received audio signal;
determining values of a new spectral shape (503) based upon decoded MDCT coefficients from the decoded new audio frame and storing the calculated values of the new spectral shape in the shape$_{old}$ buffer and the shape$_{oold}$ buffer (405), the new spectral shape comprising a number of sub-bands; and
determining a new frame energy (505) of the audio frame and storing the calculated new frame energy in the E_w$_{old}$ buffer and the E_w$_{oold}$ buffer (407).

12. A decoder apparatus (1201, 1301) adapted to perform operations according to any of Embodiments 1-11.

13. A decoder apparatus (1201, 1301) configured to control a concealment method for a lost audio frame of a received audio signal, the decoder apparatus configured to:
decode a first audio frame of the received audio signal based on a modified discrete cosine transform, MDCT;
determine values of a first spectral shape based upon decoded MDCT coefficients from the decoded audio frame and store the calculated values of the first spectral shape in a shape old buffer, the first spectral shape comprising a number of sub-bands;
determine a first frame energy of the audio frame and store the calculated first frame energy in an E_w$_{old}$ buffer;
decode a second audio frame of the received audio signal;
move the calculated values of the first spectral shape from the shape$_{old}$ buffer to a shape$_{oold}$ buffer;
move the calculated first frame energy from the E_w$_{old}$ buffer to a E_w$_{oold}$ buffer;
determine values of a second spectral shape based upon decoded MDCT coefficients from the decoded second audio frame and store the calculated values of the second spectral shape in the shape$_{old}$ buffer the second spectral shape comprising the number of sub-bands;
determining a second frame energy of the second audio frame and storing the calculated second frame energy in the E_w$_{old}$ buffer;
transform the values of the first spectral shape and the first frame energy into a first representation of a first fast Fourier transform, FFT, based spectral analysis and transform the values of the second spectral shape and the second frame energy into a second representation of a second FFT spectral analysis;
detect, based on the first representation of the first fast FFT and the second representation of a second FFT, a condition that could lead to suboptimal reconstruction quality of a substitution frame for the lost audio frame when the concealment method is used to create the substitution frame for the lost audio frame; and
responsive to detecting the condition, modify the concealment method by selectively adjusting a spectrum magnitude of a substitution frame spectrum.

14. The decoder apparatus of Embodiment 13, wherein the decoder apparatus is configured to perform the operations of Embodiments 2-11.

15. A decoder apparatus (1201, 1301) configured to control a concealment method for a lost audio frame of a received audio signal, the decoder apparatus comprising:
a processor (1305); and
a memory (1311) storing instructions that, when executed by the processor, cause the decoder apparatus (1201, 1301) to perform operations comprising:
decoding (901) a first audio frame of the received audio signal based on a modified discrete cosine transform, MDCT;
determining (903) values of a first spectral shape based upon decoded MDCT coefficients from the decoded audio frame and storing the calculated values of the first spectral shape in a shape$_{old}$ buffer, the first spectral shape comprising a number of sub-bands;
determining (905) a first frame energy of the audio frame and storing the calculated first frame energy in an E_w$_{old}$ buffer;
decoding (907) a second audio frame of the received audio signal;
moving (303, 909) the calculated values of the first spectral shape from the shape$_{old}$ buffer to a shape$_{oold}$ buffer;
moving (305, 911) the calculated first frame energy from the E_w$_{old}$ buffer to a E_w$_{oold}$ buffer;
determining (307-309, 913) values of a second spectral shape based upon decoded MDCT coefficients from the decoded second audio frame and storing the calculated values of the second spectral shape in the shape$_{old}$ buffer the second spectral shape comprising the number of sub-bands;
determining (915) a second frame energy of the second audio frame and storing the calculated second frame energy in the E_w$_{old}$ buffer;
transforming (917) the values of the first spectral shape and the first frame energy into a first representation of a first fast Fourier transform, FFT, based spectral analysis and transforming the values of the second spectral shape and the second frame energy into a second representation of a second FFT spectral analysis;
detecting (919), based on the first representation of the first fast FFT and the second representation of a second FFT, a condition that could lead to suboptimal reconstruction quality of a substitution frame for the lost audio frame when the concealment method is used to create the substitution frame for the lost audio frame; and
responsive to detecting the condition, modifying (921) the concealment method by selectively adjusting a spectrum magnitude of a substitution frame spectrum.

16. The decoder apparatus of Embodiment 1 wherein to determine the values of the first spectral shape based upon decoded MDCT coefficients, the instructions comprise further instructions that, when executed by the processor, cause the apparatus to perform operations comprising:
determining (307) a total magnitude of the MDCT coefficients;
normalizing each sub-band value of the first spectral shape; and storing each normalized sub-band value as a value of the values of the first spectral shape.

17. The decoder apparatus of Embodiment 16 wherein the total magnitude of the MDCT coefficients is determined in accordance with $$\text{shape\_tot} = \sum_{n=0}^{N_{MDCT}-1} q\_d(n)^2$$

where shape_tot is the total magnitude of the MDCT coefficients, $N_{MDCT}$ is a number of MDCT coefficients and depends on a sampling frequency, and q_d(n) are the MDCT coefficients.

18. The decoder apparatus of any of Embodiments 16-17 where the normalizing of each sub-band is normalized in accordance with $$\text{shape}_{old}(k) = \frac{1}{\text{shape\_tot}} \sum_{n=grp\_bin(k)}^{grp\_bin(k+1)-1} q\_d(n)^2, \; 0 \le k < N_{grp}$$

where $\text{shape}_{old}(k)$ is a spectral shape of a sub-band (k), shape_tot is the total magnitude of the MDCT coefficients, q_d(n) are the MDCT coefficients, grp_bin (k) is a start index for the MDCT coefficients in sub-band(k), and $N_{grp}$ is the number of sub-bands.

19. The decoder apparatus of any of Embodiments 15-18 wherein frame energy of the first frame energy and the second frame energy is determined in accordance with $$E\_w_{old} = \sum_{n=0}^{L_{prot}-1} (w_{whr}(n) \cdot x_{prev}(n))^2$$

where $E\_w_{old}$ is the frame energy, $w_{whr}$ is along FFT spectral analysis window, $x_{prev}$ is a time domain prototype signal used to create a substitution for a potentially upcoming lost frame, and $L_{prot}$ is a number of samples in the $x_{prev}$ signal.

20. The decoder apparatus of any of Embodiments 15-19, wherein to transform the values of the first spectral shape and the first frame energy into the first representation of a first fast FFT based spectral analysis and to transform the values of the second spectral shape and the second frame energy into a second representation of a second FFT spectral analysis, the instructions comprise further instructions that, when executed by the processor, cause the apparatus to perform operations comprising:
applying a conversion factor to the values of the first spectral shape and the first frame energy and to the values of the second spectral shape and the second frame energy.

21. The decoder apparatus of Embodiment 20 wherein the conversion factor depends on a sampling frequency of the decoding.

22. The decoder apparatus of any of Embodiments 20-21, further comprising:
transforming the values of the first spectral shape and the first frame energy into the first representation of a first fast FFT based spectral analysis and transforming the values of the second spectral shape and the second frame energy into a second representation of a second FFT spectral analysis in accordance with $$E_{oold}(k) = \mu \cdot \text{shape}_{oold}(k) \cdot E\_w_{oold}, \; 0 \le k < N_{grp}$$

and $$E_{old}(k) = \mu \cdot \text{shape}_{old}(k) \cdot E\_w_{old}, \; 0 \le k < N_{grp}$$

where $E_{old}(k)$ is the first representation, $\mu$ is the conversion factor, $\text{shape}_{oold}(k)$ is a spectral shape of a sub-band (k) of the first spectral shape, $E\_w_{oold}$ is the first frame energy, $E_{old}(k)$ is the second representation, $\text{shape}_{old}(k)$ is a spectral shape of a sub-band (k) f the second spectral shape, $E\_w_{old}$ is the second frame energy, and $N_{grp}$ is the number of sub-bands.

23. The decoder apparatus of Embodiment 22 wherein the instructions comprise further instructions that, when executed by the processor, cause the apparatus to perform operations further comprising:
determining (1105) if a sub-band transient is above a threshold value based on $E_{oold}(k)$ and $E_{old}(k)$; and
responsive to a sub-band transient being above the threshold value, modifying the concealment method by selectively adjusting (1107) the spectrum magnitude of the substitution frame spectrum.

24. The decoder apparatus of Embodiment 22 wherein the substitution frame spectrum is calculated according to an expression of $$Z(m) = \alpha(m) \cdot \beta(m) \cdot Y(m) \cdot e_k^{j(\theta_k + \vartheta(m))}$$

and adjusting the spectrum magnitude comprises adjusting β(m) (1107), where Z(m) is the substitution frame spectrum, α(m) is a first magnitude attenuation factor, β(m) is a second magnitude attenuation factor, Y(m) is a protype frame, $\theta_k$ is a phase shift, and ϑ(m) is an additive phase component 25. The decoder apparatus of any of Embodiments 1-10 wherein the instructions comprise further instructions that, when executed by the processor, cause the apparatus to perform operations further comprising:
receiving a bad frame indicator (403, 501);
responsive to receiving the bad frame indicator, flushing the $\text{shape}_{oold}$ buffer and the $E\_w_{oold}$ energy buffer;
receiving a new audio frame of the received audio signal;
determining values of a new spectral shape (503) based upon decoded MDCT coefficients from the decoded new audio frame and storing the calculated values of the new spectral shape in the $\text{shape}_{old}$ buffer and the $\text{shape}_{oold}$ buffer (405), the new spectral shape comprising a number of sub-bands; and
determining a new frame energy (505) of the audio frame and storing the calculated new frame energy in the $E\_w_{old}$ buffer and the $E\_w_{oold}$ buffer (407).

ADDITIONAL EXPLANATION

Generally, all terms used herein are to be interpreted according to their ordinary meaning in the relevant technical field, unless a different meaning is clearly given and/or is implied from the context in which it is used. All references to a/an/the element, apparatus, component, means, step, etc. are to be interpreted openly as referring to at least one instance of the element, apparatus, component, means, step, etc., unless explicitly stated otherwise. The steps of any methods disclosed herein do not have to be performed in the exact order disclosed, unless a step is explicitly described as following or preceding another step and/or where it is implicit that a step must follow or precede another step. Any feature of any of the embodiments disclosed herein may be applied to any other embodiment, wherever appropriate. Likewise, any advantage of any of the embodiments may apply to any other embodiments, and vice versa. Other objectives, features and advantages of the enclosed embodiments will be apparent from the following description.

Some of the embodiments contemplated herein will now be described more fully with reference to the accompanying drawings. Other embodiments, however, are contained within the scope of the subject matter disclosed herein, the disclosed subject matter should not be construed as limited to only the embodiments set forth herein; rather, these embodiments are provided by way of example to convey the scope of the subject matter to those skilled in the art.

Any appropriate steps, methods, features, functions, or benefits disclosed herein may be performed through one or more functional units or modules of one or more virtual apparatuses. Each virtual apparatus may comprise a number of these functional units. These functional units may be implemented via processing circuitry, which may include one or more microprocessor or microcontrollers, as well as other digital hardware, which may include digital signal processors (DSPs), special-purpose digital logic, and the like. The processing circuitry may be configured to execute program code stored in memory, which may include one or several types of memory such as read-only memory (ROM), random-access memory (RAM), cache memory, flash memory devices, optical storage devices, etc. Program code stored in memory includes program instructions for executing one or more telecommunications and/or data communications protocols as well as instructions for carrying out one or more of the techniques described herein. In some implementations, the processing circuitry may be used to cause the respective functional unit to perform corresponding functions according one or more embodiments of the present disclosure.

The term unit may have conventional meaning in the field of electronics, electrical devices and/or electronic devices and may include, for example, electrical and/or electronic circuitry, devices, modules, processors, memories, logic solid state and/or discrete devices, computer programs or instructions for carrying out respective tasks, procedures, computations, outputs, and/or displaying functions, and so on, as such as those that are described herein.

In the above-description of various embodiments of present inventive concepts, it is to be understood that the terminology used herein is for the purpose of describing particular embodiments only and is not intended to be limiting of present inventive concepts. Unless otherwise defined, all terms (including technical and scientific terms) used herein have the same meaning as commonly understood by one of ordinary skill in the art to which present inventive concepts belong. It will be further understood that terms, such as those defined in commonly used dictionaries, should be interpreted as having a meaning that is consistent with their meaning in the context of this specification and the relevant art and will not be interpreted in an idealized or overly formal sense unless expressly so defined herein.

When an element is referred to as being "connected", "coupled", "responsive", or variants thereof to another element, it can be directly connected, coupled, or responsive to the other element or intervening elements may be present. In contrast, when an element is referred to as being "directly connected", "directly coupled", "directly responsive", or variants thereof to another element, there are no intervening elements present. Like numbers refer to like elements throughout. Furthermore, "coupled", "connected", "responsive", or variants thereof as used herein may include wirelessly coupled, connected, or responsive. As used herein, the singular forms "a", "an" and "the" are intended to include the plural forms as well, unless the context clearly indicates otherwise. Well-known functions or constructions may not be described in detail for brevity and/or clarity. The term "and/or" includes any and all combinations of one or more of the associated listed items.

It will be understood that although the terms first, second, third, etc. may be used herein to describe various elements/operations, these elements/operations should not be limited by these terms. These terms are only used to distinguish one element/operation from another element/operation. Thus a first element/operation in some embodiments could be termed a second element/operation in other embodiments without departing from the teachings of present inventive concepts. The same reference numerals or the same reference designators denote the same or similar elements throughout the specification.

As used herein, the terms "comprise", "comprising", "comprises", "include", "including", "includes", "have", "has", "having", or variants thereof are open-ended, and include one or more stated features, integers, elements, steps, components or functions but does not preclude the presence or addition of one or more other features, integers, elements, steps, components, functions or groups thereof. Furthermore, as used herein, the common abbreviation "e.g.", which derives from the Latin phrase "exempli gratia," may be used to introduce or specify a general example or examples of a previously mentioned item, and is not intended to be limiting of such item. The common abbreviation "i.e.", which derives from the Latin phrase "id est," may be used to specify a particular item from a more general recitation.

Example embodiments are described herein with reference to block diagrams and/or flowchart illustrations of computer-implemented methods, apparatus (systems and/or devices) and/or computer program products. It is understood that a block of the block diagrams and/or flowchart illustrations, and combinations of blocks in the block diagrams and/or flowchart illustrations, can be implemented by computer program instructions that are performed by one or more computer circuits. These computer program instructions may be provided to a processor circuit of a general purpose computer circuit, special purpose computer circuit, and/or other programmable data processing circuit to produce a machine, such that the instructions, which execute via the processor of the computer and/or other programmable data processing apparatus, transform and control transistors, values stored in memory locations, and other hardware components within such circuitry to implement the functions/acts specified in the block diagrams and/or flowchart block or blocks, and thereby create means (functionality) and/or structure for implementing the functions/acts specified in the block diagrams and/or flowchart block(s).

These computer program instructions may also be stored in a tangible computer-readable medium that can direct a computer or other programmable data processing apparatus to function in a particular manner, such that the instructions stored in the computer-readable medium produce an article of manufacture including instructions which implement the functions/acts specified in the block diagrams and/or flowchart block or blocks. Accordingly, embodiments of present inventive concepts may be embodied in hardware and/or in software (including firmware, resident software, microcode, etc.) that runs on a processor such as a digital signal processor, which may collectively be referred to as "circuitry," "a module" or variants thereof.

It should also be noted that in some alternate implementations, the functions/acts noted in the blocks may occur out of the order noted in the flowcharts. For example, two blocks shown in succession may in fact be executed substantially concurrently or the blocks may sometimes be executed in the reverse order, depending upon the functionality/acts involved. Moreover, the functionality of a given block of the flowcharts and/or block diagrams may be separated into multiple blocks and/or the functionality of two or more blocks of the flowcharts and/or block diagrams may be at least partially integrated. Finally, other blocks may be added/inserted between the blocks that are illustrated, and/or blocks/operations may be omitted without departing from the scope of inventive concepts. Moreover, although some of the diagrams include arrows on communication paths to show a primary direction of communication, it is to be understood that communication may occur in the opposite direction to the depicted arrows.

Many variations and modifications can be made to the embodiments without substantially departing from the principles of the present inventive concepts. All such variations and modifications are intended to be included herein within the scope of present inventive concepts. Accordingly, the above disclosed subject matter is to be considered illustrative, and not restrictive, and the examples of embodiments are intended to cover all such modifications, enhancements, and other embodiments, which fall within the spirit and scope of present inventive concepts. Thus, to the maximum extent allowed by law, the scope of present inventive concepts are to be determined by the broadest permissible interpretation of the present disclosure including the examples of embodiments and their equivalents, and shall not be restricted or limited by the foregoing detailed description. Appendix 1 forms a part of this disclosure.

The invention claimed is:

1. A method for controlling a concealment method for a lost audio frame associated with a received audio signal, the method comprising:

decoding a first audio frame of the received audio signal to obtain modified discrete cosine transform, MDCT coefficients;

determining values of a first spectral shape based upon the decoded MDCT coefficients obtained for the first audio frame, the first spectral shape comprising a number of sub-bands;

decoding a second audio frame, subsequent to the first audio frame, of the received audio signal to obtain MDCT coefficients for the second audio frame, the second audio frame preceding the lost audio frame;

determining values of a second spectral shape based upon the decoded MDCT coefficients obtained from the second audio frame, the second spectral shape comprising the number of sub-bands;

transforming the values of the first spectral shape and a first frame energy of the first audio frame into a first representation of a first fast Fourier transform, FFT, based spectral analysis and transforming the values of the second spectral shape and a second frame energy of the second audio frame into a second representation of a second FFT spectral analysis;

detecting, based on the first representation of the first FFT and the second representation of a second FFT, a transient; and responsive to detecting the transient, modifying the concealment method by selectively adjusting a spectrum magnitude of a substitution frame spectrum.

2. The method of claim 1 wherein determining the values of the first spectral shape based upon the MDCT coefficients comprises:

determining a total magnitude of the MDCT coefficients;

normalizing each sub-band value of the first spectral shape; and storing each normalized sub-band value as a value of the values of the first spectral shape.

3. The method of claim 2 wherein the total magnitude of the MDCT coefficients is determined in accordance with $$\text{shape\_tot} = \sum_{n=0}^{N_{MDCT}-1} q\_d(n)^2$$

where shape_tot is the total magnitude of the MDCT coefficients, $N_{MDCT}$ is a number of MDCT coefficients and depends on a sampling frequency, and $q\_d(n)$ are the MDCT coefficients.

4. The method of claim 2 wherein the normalizing of each sub-band is normalized in accordance with $$\text{shape}_{old}(k) = \frac{1}{\text{shape\_tot}} \sum_{n=grp\_bin(k)}^{grp\_bin(k+1)-1} q\_d(n)^2, 0 \leq k < N_{grp}$$

where $\text{shape}_{old}(k)$ is a spectral shape of a sub-band (k), shape_tot is the total magnitude of the MDCT coefficients, $q\_d(n)$ are the MDCT coefficients, $grp\_bin(k)$ is a start index for the MDCT coefficients in sub-band(k), and $N_{grp}$ is a number of sub-bands.

5. The method of claim 1, wherein transforming the values of the first spectral shape and the first frame energy into the first representation of a first FFT based spectral analysis and transforming the values of the second spectral shape and the second frame energy into a second representation of a second FFT spectral analysis comprises applying a conversion factor to the values of the first spectral shape and the first frame energy and to the values of the second spectral shape and the second frame energy.

6. The method of claim 5 wherein the conversion factor depends on a sampling frequency.

7. The method of claim 4, further comprising:

transforming the values of the first spectral shape and the first frame energy into the first representation of a first FFT based spectral analysis and transforming the values of the second spectral shape and the second frame energy into a second representation of a second FFT spectral analysis in accordance with $$E_{oold}(k) = \mu \cdot \text{shape}_{oold}(k) \cdot E\_w_{oold}, 0 \leq k < N_{grp}$$

and $$E_{old}(k) = \mu \cdot \text{shape}_{old}(k) \cdot E\_w_{old}, 0 \leq k < N_{grp}$$

where $E_{oold}(k)$ is the first representation, $\mu$ is the conversion factor, $\text{shape}_{oold}(k)$ is a spectral shape of a sub-band (k) of the first spectral shape, $E\_w_{oold}$ is the first frame energy, $E_{old}(k)$ is the second representation, $\text{shape}_{old}(k)$ is a spectral shape of a sub-band (k) of the second spectral shape, $E\_w_{old}$ is the second frame energy, and $N_{grp}$ is the number of sub-bands.

8. The method of claim 7 further comprising:
determining if a ratio between the respective band energies of the frames associated with $E_{oold}(k)$ and $E_{old}(k)$ is above a threshold value; and
responsive to the ratio being above the threshold value, modifying the concealment method by selectively adjusting the spectrum magnitude of the substitution frame spectrum.

9. The method of claim 8 wherein the substitution frame spectrum is calculated according to an expression of $$Z(m) = \alpha(m) \cdot \beta(m) \cdot Y(m) \cdot e_k^{j(\theta + \vartheta(m))}$$

and adjusting the spectrum magnitude comprises adjusting $\beta(m)$, where $Z(m)$ is the substitution frame spectrum, $\alpha(m)$ is a first magnitude attenuation factor, $\beta(m)$ is a second magnitude attenuation factor, $Y(m)$ is a protype frame, $\theta_k$ is a phase shift, and $\vartheta(m)$ is an additive phase component.

10. The method of claim 1, further comprising:
storing the determined values of the first spectral shape in a $shape_{old}$ buffer;
determining the first frame energy of the first audio frame and storing the determined first frame energy in an $E\_w_{old}$ buffer;
responsive to decoding the second audio frame, moving the determined values of the first spectral shape from the $shape_{old}$ buffer to a $shape_{oold}$ buffer;
moving the determined first frame energy from the $E\_w_{old}$ buffer to an $E\_w_{oold}$ buffer;
storing the determined values of the second spectral shape in the $shape_{old}$ buffer; and
determining the second frame energy of the second audio frame and storing the determined second frame energy in the $E\_w_{old}$ buffer.

11. The method of claim 1 wherein frame energy of each of the first frame energy and the second frame energy is determined in accordance with $$E\_w_{oold} = E\_w_{old}$$

$$E\_w_{old} = \sum_{n=0}^{L_{prot}-1} (w_{whr}(n) \cdot x_{prev}(n))^2$$

where $E\_w_{oold}$ is a previous frame energy, $E\_w_{old}$ is the frame energy of the first frame being calculated or the second frame being calculated, $w_{whr}$ is a long FFT spectral analysis window, $x_{prev}$ is a time domain prototype signal used to create a substitution for a potentially upcoming lost frame, and $L_{prot}$ is a number of samples in the $x_{prev}$ signal.

12. The method of claim 10, further comprising:
receiving a bad frame indicator;
responsive to receiving the bad frame indicator, flushing the $shape_{oold}$ buffer and the $E\_w_{oold}$ energy buffer;
receiving a new audio frame of the received audio signal;
determining values of a new spectral shape based upon decoded MDCT coefficients from decoding the new audio frame and storing the calculated values of the new spectral shape in the $shape_{old}$ buffer and the $shape_{oold}$ buffer, the new spectral shape comprising a number of sub-bands; and
determining a new frame energy of the audio frame and storing the calculated new frame energy in the $E\_w_{old}$ buffer and the $E\_w_{oold}$ buffer.

13. An apparatus configured to control a concealment method for a lost audio frame associated with a received audio signal, the apparatus configured to:
decode a first audio frame of the received audio signal to obtain modified discrete cosine transform, MDCT, coefficients;
determine values of a first spectral shape based upon the decoded MDCT coefficients obtained for the first audio frame, the first spectral shape comprising a number of sub-bands;
decode a second audio frame, subsequent to the first audio frame, of the received audio signal to obtain MDCT coefficients for the second audio frame, the second audio frame preceding the lost audio frame;
determine values of a second spectral shape based upon the decoded MDCT coefficients obtained for the second audio frame, the second spectral shape comprising the number of sub-bands;
transform the values of the first spectral shape and a first frame energy of the first audio frame into a first representation of a first fast Fourier transform, FFT, based spectral analysis and transform the values of the second spectral shape and a second frame energy of the second audio frame into a second representation of a second FFT spectral analysis;
detect, based on the first representation of the first FFT and the second representation of a second FFT, a transient; and
responsive to detecting the transient, modify the concealment method by selectively adjusting a spectrum magnitude of a substitution frame spectrum.

14. The apparatus of claim 13 is further configured to:
determine a total magnitude of the MDCT coefficients;
normalize each sub-band value of the first spectral shape; and
store each normalized sub-band value as a value of the values of the first spectral shape.

15. The apparatus of claim 14 wherein the total magnitude of the MDCT coefficients is determined in accordance with $$shape\_tot = \sum_{n=0}^{N_{MDCT}-1} q\_d(n)^2$$

where shape_tot is the total magnitude of the MDCT coefficients, $N_{MDCT}$ is a number of MDCT coefficients and depends on a sampling frequency, and q_d(n) are the MDCT coefficients.

16. The apparatus of claim 14 wherein the normalizing of each sub-band is normalized in accordance with $$shape_{old}(k) = \frac{1}{shape\_tot} \sum_{n=grp\_bin(k)}^{grp\_bin(k+1)-1} q\_d(n)^2, \ 0 \le k < N_{grp}$$

where $shape_{old}(k)$ is a spectral shape of a sub-band (k), shape_tot is the total magnitude of the MDCT coefficients, q_d(n) are the MDCT coefficients, grp_bin(k) is a start index for the MDCT coefficients in sub-band(k), and $N_{grp}$ is a number of sub-bands.

17. The apparatus of claim 13 further configured to:
apply a conversion factor to the values of the first spectral shape and the first frame energy and to the values of the second spectral shape and the second frame energy.

18. The apparatus of claim 17 wherein the conversion factor depends on a sampling frequency.

19. The apparatus of claim 16 further configured to:
transform the values of the first spectral shape and the first frame energy into the first representation of a first FFT based spectral analysis and transforming the values of the second spectral shape and the second frame energy into a second representation of a second FFT spectral analysis in accordance with $$E_{oold}(k) = \mu \cdot shape_{oold}(k) \cdot E\_w_{oold}, \quad 0 \leq k < N_{grp}$$

and $$E_{old}(k) = \mu \cdot shape_{old}(k) \cdot E\_w_{old}, \quad 0 \leq k < N_{grp}$$

where $E_{oold}(k)$ is the first representation, $\mu$ is the conversion factor, $shape_{oold}(k)$ is a spectral shape of a sub-band (k) of the first spectral shape, $E\_w_{oold}$ is the first frame energy, $E_{old}(k)$ is the second representation, $shape_{old}(k)$ is a spectral shape of a sub-band (k) f the second spectral shape, $E\_w_{old}$ is the second frame energy, and $N_{grp}$ is the number of sub-bands.

20. The apparatus of claim 19 further configured to:
determine if a ratio between the respective band energies of the frames associated with $E_{oold}(k)$ and $E_{old}(k)$ is above a threshold value; and
responsive to the ratio being above the threshold value, modify the concealment method by selectively adjusting the spectrum magnitude of the substitution frame spectrum.

21. The apparatus of claim 20 wherein the substitution frame spectrum is calculated according to an expression of $$Z(m) = \alpha(m) \cdot \beta(m) \cdot Y(m) \cdot e_k^{j(\theta + \vartheta(m))}$$

and adjusting the spectrum magnitude comprises adjusting $\beta(m)$, where $Z(m)$ is the substitution frame spectrum, $\alpha(m)$ is a first magnitude attenuation factor, $\beta(m)$ is a second magnitude attenuation factor, $Y(m)$ is a protype frame, $\theta_k$ is a phase shift, and $\vartheta(m)$ is an additive phase component.

22. The apparatus of claim 13 further configured to:
store the determined values of the first spectral shape in a $shape_{old}$ buffer;
determine the first frame energy of the first audio frame and storing the determined first frame energy in an $E\_w_{old}$ buffer;
responsive to decoding the second audio frame, moving the determined values of the first spectral shape from the $shape_{old}$ buffer to a $shape_{oold}$ buffer;
move the determined first frame energy from the $E\_w_{old}$ buffer to an $E\_w_{oold}$ buffer;
store the determined values of the second spectral shape in the $shape_{old}$ buffer; and
determine the second frame energy of the second audio frame and storing the determined second frame energy in the $E\_w_{old}$ buffer.

23. The apparatus of claim 13 wherein frame energy of each of the first frame energy and the second frame energy is determined in accordance with $$E\_w_{oold} = E\_w_{old}$$

$$E\_w_{old} = \sum_{n=0}^{L_{prot}-1} (w_{whr}(n) \cdot x_{prev}(n))^2$$

where $E\_w_{oold}$ is a previous frame energy, $E\_w_{old}$ is the frame energy of the first frame being calculated or the second frame being calculated, $w_{whr}$ is a long FFT spectral analysis window, $x_{prev}$ is a time domain prototype signal used to create a substitution for a potentially upcoming lost frame, and $L_{prot}$ is a number of samples in the $x_{prev}$ signal.

24. The apparatus of claim 22 further configured to:
receive a bad frame indicator;
responsive to receiving the bad frame indicator, flush the $shape_{oold}$ buffer and the $E\_w_{oold}$ energy buffer;
receive a new audio frame of the received audio signal;
determine values of a new spectral shape based upon decoded MDCT coefficients from decoding the new audio frame and storing the calculated values of the new spectral shape in the $shape_{old}$ buffer and the $shape_{oold}$ buffer, the new spectral shape comprising a number of sub-bands; and
determine a new frame energy of the audio frame and storing the calculated new frame energy in the $E\_w_{old}$ buffer and the $E\_w_{oold}$ buffer.

25. The apparatus of claim 13 wherein the apparatus is an audio decoder.

\* \* \* \* \*

UNITED STATES PATENT AND TRADEMARK OFFICE
CERTIFICATE OF CORRECTION

PATENT NO. : 12,230,280 B2
APPLICATION NO. : 18/524622
DATED : February 18, 2025
INVENTOR(S) : Sehlstedt et al.

Page 1 of 2

It is certified that error appears in the above-identified patent and that said Letters Patent is hereby corrected as shown below:

In the Specification

In Column 4, Line 9, delete "shape$_{old}$" and insert -- shape$_{oold}$ --, therefor.

In Column 10, Line 2, delete "u" and insert -- μ --, therefor.

In Column 11, Line 35, delete "shape old" and insert -- shape$_{old}$ --, therefor.

In Column 12, Lines 4-6, delete " $R_{old\backslash oold,band}(k) = \dfrac{E_{old}(k)}{E_{oold}(k)}.$ " and insert -- $R_{old\backslash oold,band}(k) = \dfrac{E_{old}(k)}{E_{oold}(k)}$ --, therefor.

In Column 12, Line 10, delete "I$_k$=[m$_{k-1}$+1, . . . m$_k$]" and insert -- I$_k$=[m$_{k-1}$+1, . . . , m$_k$] --, therefor.

In Column 14, Line 55, delete "shape old" and insert -- shape$_{old}$ --, therefor.

In Column 16, Line 14, delete "signal prey" and insert -- signal. --, therefor.

In Column 16, Line 37, delete "E$_{oold}$(k)=μ·shape$_{oold}$(k)·E_w$_{oold}$," and insert -- E$_{oold}$(k)=μ·shape$_{oold}$(k)·E_w$_{oold}$, --, therefor.

In Column 17, Line 32, delete "shape old" and insert -- shape$_{old}$ --, therefor.

In Column 20, Line 9, delete "E$_{old}$(k)" and insert -- E$_{oold}$(k) --, therefor.

Signed and Sealed this
Twelfth Day of August, 2025

Coke Morgan Stewart
*Acting Director of the United States Patent and Trademark Office*

CERTIFICATE OF CORRECTION (continued)
U.S. Pat. No. 12,230,280 B2

In the Claims

In Column 24, Line 22, in Claim 3, delete "q _d(n)" and insert -- q_d(n) --, therefor.

In Column 25, Line 16, in Claim 9, delete "protype" and insert -- prototype --, therefor.

In Column 27, Line 18, in Claim 19, delete "f the" and insert -- of the --, therefor.

In Column 27, Line 36, in Claim 21, delete "protype" and insert -- prototype --, therefor.